United States Patent
Agiwal et al.

(10) Patent No.: US 10,904,859 B2
(45) Date of Patent: *Jan. 26, 2021

(54) SYSTEM AND METHOD OF PAGING IN NEXT GENERATION WIRELESS COMMUNICATION SYSTEM

(71) Applicant: Samsung Electronics Co., Ltd., Suwon-si (KR)

(72) Inventors: Anil Agiwal, Suwon-si (KR); Youngbin Chang, Anyang-si (KR); Anshuman Nigam, Bangalore (IN); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,312

(22) Filed: Aug. 3, 2020

(65) Prior Publication Data

US 2020/0367197 A1  Nov. 19, 2020

Related U.S. Application Data

(63) Continuation of application No. 16/827,402, filed on Mar. 23, 2020, now Pat. No. 10,764,862, which is a (Continued)

(30) Foreign Application Priority Data

Jun. 21, 2016 (IN) .............................. 201641021194

(51) Int. Cl.
*H04W 68/00* (2009.01)
*H04B 7/06* (2006.01)
(Continued)

(52) U.S. Cl.
CPC ........ *H04W 68/005* (2013.01); *H04B 7/0695* (2013.01); *H04B 7/088* (2013.01);
(Continued)

(58) Field of Classification Search
CPC ...... H04B 7/088; H04B 7/0695; H04B 7/005; H04B 7/0717; H04W 68/005;
(Continued)

(56) References Cited

U.S. PATENT DOCUMENTS 5,905,443 A   5/1999  Olds et al.
6,233,466 B1  5/2001  Wong et al.
(Continued)

FOREIGN PATENT DOCUMENTS

CN   103124399 A    5/2013
EP     2260581 A2  12/2010
(Continued)

OTHER PUBLICATIONS

International Search Report for International Application No. PCT/KR2017/006549, dated Sep. 22, 2017, 3 pages.
(Continued)

*Primary Examiner* — Mahendra R Patel

(57) ABSTRACT

A communication method and system for converging a 5th-Generation (5G) communication system and for supporting higher data rates beyond a 4th-Generation (4G) system with a technology for Internet of Things (IoT) may be applied to intelligent services based on the 5G communication technology and the IoT-related technology, such as smart home, smart building, smart city, smart car, connected car, health care, digital education, smart retail, security and safety services. An apparatus and method are provided for transmitting/receiving a paging message in a next generation communication system.

20 Claims, 30 Drawing Sheets

Related U.S. Application Data continuation of application No. 16/730,075, filed on Dec. 30, 2019, now Pat. No. 10,609,676, which is a continuation of application No. 16/256,956, filed on Jan. 24, 2019, now Pat. No. 10,524,228, which is a continuation of application No. 15/629,620, filed on Jun. 21, 2017, now Pat. No. 10,231,208.

(51) Int. Cl.
  *H04B 7/08* (2006.01)
  *H04W 68/02* (2009.01)
  *H04W 16/28* (2009.01)
  *H04B 7/005* (2006.01)

(52) U.S. Cl.
  CPC ......... *H04W 68/02* (2013.01); *H04W 68/025* (2013.01); *H04B 7/005* (2013.01); *H04W 16/28* (2013.01)

(58) Field of Classification Search
  CPC ... H04W 68/02; H04W 68/025; H04W 16/28; H04J 11/00; H04L 5/00
  USPC .......................................................... 455/458
  See application file for complete search history.

(56) References Cited

U.S. PATENT DOCUMENTS

| | | | |
|---|---|---|---|
| 9,775,183 B2* | 9/2017 | Miklos | H04W 72/042 |
| 2002/0094843 A1 | 7/2002 | Hunzinger | |
| 2009/0232240 A1 | 9/2009 | Lakkis | |
| 2010/0195566 A1* | 8/2010 | Krishnamurthy | H04L 5/0007 370/328 |
| 2010/0260154 A1 | 10/2010 | Frank et al. | |
| 2010/0279715 A1* | 11/2010 | Alanara | H04W 68/02 455/458 |
| 2011/0223942 A1 | 9/2011 | Xu et al. | |
| 2012/0011247 A1* | 1/2012 | Mallik | H04W 8/005 709/224 |
| 2012/0044910 A1* | 2/2012 | Maeda | H04L 5/0005 370/332 |
| 2012/0115485 A1* | 5/2012 | Narasimha | H04W 68/02 455/437 |
| 2012/0238208 A1 | 9/2012 | Bienas et al. | |
| 2012/0287875 A1 | 11/2012 | Kim et al. | |
| 2012/0300655 A1* | 11/2012 | Lee | H04W 76/28 370/252 |
| 2013/0109391 A1* | 5/2013 | Lee | H04W 48/12 455/436 |
| 2013/0182685 A1 | 7/2013 | Yu et al. | |
| 2013/0208678 A1* | 8/2013 | Zhang | H04L 5/0053 370/329 |
| 2014/0036747 A1* | 2/2014 | Nory | H04W 74/0833 370/311 |
| 2014/0036806 A1* | 2/2014 | Chen | H04W 72/0406 370/329 |
| 2014/0044027 A1* | 2/2014 | Beale | H04W 56/00 370/311 |
| 2014/0079036 A1 | 3/2014 | Montojo et al. | |
| 2014/0098660 A1 | 4/2014 | Viorel et al. | |
| 2014/0128109 A1* | 5/2014 | Li | H04W 68/02 455/458 |
| 2014/0211750 A1* | 7/2014 | Larsson | H04L 5/0092 370/330 |
| 2014/0254553 A1* | 9/2014 | Shin | H04W 68/02 370/331 |
| 2014/0301330 A1* | 10/2014 | Lee | H04W 74/0833 370/329 |
| 2014/0335867 A1* | 11/2014 | Hsu | H04W 68/02 455/437 |
| 2015/0031382 A1* | 1/2015 | Damnjanovic | H04W 68/025 455/452.1 |
| 2015/0126206 A1* | 5/2015 | Krishnamurthy | H04W 52/0206 455/452.1 |
| 2015/0173039 A1* | 6/2015 | Rune | H04W 52/0216 370/311 |
| 2015/0215856 A1 | 7/2015 | Kim et al. | |
| 2015/0282076 A1* | 10/2015 | Larmo | H04W 36/0088 370/311 |
| 2016/0029333 A1* | 1/2016 | Seo | H04W 56/0015 370/350 |
| 2016/0044652 A1 | 2/2016 | Xue et al. | |
| 2016/0119895 A1 | 4/2016 | Agiwal et al. | |
| 2016/0135247 A1* | 5/2016 | Ozturk | H04W 36/0016 455/436 |
| 2016/0164653 A1* | 6/2016 | Wang | H04L 5/0048 370/329 |
| 2016/0205659 A1* | 7/2016 | Bergman | H04L 1/1812 370/252 |
| 2017/0111886 A1 | 4/2017 | Kim et al. | |
| 2017/0311276 A1 | 10/2017 | Tsai et al. | |
| 2017/0367069 A1 | 12/2017 | Agiwal et al. | |
| 2018/0351624 A1* | 12/2018 | Hakola | H04B 7/0617 |
| 2020/0169980 A1* | 5/2020 | Du | H04W 4/06 |

FOREIGN PATENT DOCUMENTS

| | | |
|---|---|---|
| JP | H10-173585 A | 6/1998 |
| KR | 10-2002-0014276 A | 2/2002 |
| KR | 10-2010-0094276 A | 8/2010 |
| KR | 10-2013-0003321 A | 1/2013 |
| WO | 9926425 A2 | 5/1999 |
| WO | 2004017581 A1 | 2/2004 |
| WO | 2014181981 A1 | 11/2014 |
| WO | 2015065152 A1 | 5/2015 |
| WO | 2016168959 A1 | 10/2016 |

OTHER PUBLICATIONS

Supplementary European Search Report dated Jun. 4, 2019 in connection with European Patent Application No. EP 17815722.8, 8 pages.

3GPP TS 36.304 V13.1 0 (Mar. 2016), Technical Specification, 3rd Generation Partnership Project; Technical Specification Group Radio Access Network; Evolved Universal Terrestrial Radio Access (E-UTRA); User Equipment (UE) procedures in idle mode (Release 13), Mar. 2016, 43 pages.

* cited by examiner

SYSTEM AND METHOD OF PAGING IN NEXT GENERATION WIRELESS COMMUNICATION SYSTEM

CROSS-REFERENCE TO RELATED APPLICATIONS

This application is a continuation of application Ser. No. 16/827,402, filed Mar. 23, 2020, which is a continuation of application Ser. No. 16/730,075, filed Dec. 30, 2019, now U.S. Pat. No. 10,609,676, which is a continuation of application Ser. No. 16/256,956, filed Jan. 24, 2019, now U.S. Pat. No. 10,524,228, which is a continuation of application Ser. No. 15/629,620, filed Jun. 21, 2017, now U.S. Pat. No. 10,231,208, which claims priority to Indian Provisional Application No. 201641021194, filed Jun. 21, 2016, the entire disclosures of which are incorporated herein by reference.

BACKGROUND

1. Field

The present disclosure relates generally to a paging procedure, and more particularly, to a paging procedure in next generation communication system.

2. Description of Related Art

In the recent years several broadband wireless technologies have been developed to meet the growing number of broadband subscribers and to provide more and better applications and services. The 3$^{rd}$ generation partnership project 2 (3GPP2) developed code division multiple access 2000 (CDMA 2000), lx evolution data optimized (1×EVDO) and ultra-mobile broadband (UMB) systems. The 3$^{rd}$ generation partnership project (3GPP) developed wideband code division multiple access (WCDMA), high speed packet access (HSPA) and long term evolution (LTE) systems. The Institute of Electrical and Electronics Engineers developed mobile worldwide interoperability for microwave access (WiMAX) systems. As more and more people become users of mobile communication systems and more and more services are provided over these systems, there is an increasing need mobile communication system with large capacity, high throughput, lower latency and better reliability.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the next generation wireless communication system operating in high frequency bands, paging needs to be transmitted using beamforming. Paging transmission/reception using beamforming leads to increased signaling overhead and UE power consumption. So, an enhanced method of paging transmission/reception is needed.

SUMMARY

To address the above-discussed deficiencies, it is designed a primary object to address at least the problems and/or disadvantages described above and to provide at least the advantages described below.

Accordingly, an aspect of the present disclosure is to provide a method and apparatus for transmitting/receiving a paging message in a next generation communication system, thereby improving the communication system performance.

In accordance with an aspect of the present disclosure, a method for receiving a paging message by a terminal is provided. The method comprises identifying a paging occasion in which a paging message is to be received in a paging frame; and receiving the paging message, which is transmitted on a transmission beam, on a reception beam in a paging slot among a plurality of paging slots in the paging occasion, from a base station.

In accordance with another aspect of the present disclosure, a terminal receiving a paging message is provided. The terminal comprises a transceiver to transmit and receive signals; and an at least one processor configured to identify a paging occasion in which a paging message is to be received in a paging frame, and to receive the paging message, which is transmitted on a transmission beam, on a reception beam in a paging slot among a plurality of paging slots in the paging occasion, from a base station.

In accordance with another aspect of the present disclosure, a method for transmitting a paging message by a base station is provided. The method comprises identifying a paging occasion in which a paging message is to be transmitted in a paging frame; and transmitting the paging message on a transmission beam in a paging slot among a plurality of paging slots in the paging occasion, to a terminal.

In accordance with another aspect of the present disclosure, a base station transmitting a paging message is provided. The base station comprises a transceiver to transmit and receive signals; and an at least one processor configured to identify a paging occasion in which a paging message is to be transmitted in a paging frame, and to transmit the paging message on a transmission beam in a paging slot among a plurality of paging slots in the paging occasion, to a terminal.

In accordance with another aspect of the present disclosure, a method for receiving a paging message by a terminal is provided. The method comprises transmitting a beam indication signal indicating a transmission beam, to a base station; and receiving a paging message, which is transmitted on the transmission beam indicated by the beam indication signal in a paging occasion, from the base station.

In accordance with another aspect of the present disclosure, a terminal receiving a paging message is provided. The terminal comprises a transceiver to transmit and receive signals; and an at least one processor configured to transmit a beam indication signal indicating a transmission beam, to a base station, and to receive a paging message, which is transmitted on the transmission beam indicated by the beam indication signal in a paging occasion, from the base station.

In accordance with another aspect of the present disclosure, a method for transmitting a paging message by a base station is provided. The method comprises receiving a beam indication signal indicating a transmission beam, from a terminal; and transmitting a paging message, which is transmitted on the transmission beam indicated by the beam indication signal in a paging occasion, to the terminal.

In accordance with another aspect of the present disclosure, a base station transmitting a paging message is provided. The base station comprises a transceiver to transmit and receive signals; and an at least one processor configured to receive a beam indication signal indicating a transmission beam, from a terminal, and to transmit a paging message, which is transmitted on the transmission beam indicated by the beam indication signal in a paging occasion, to the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
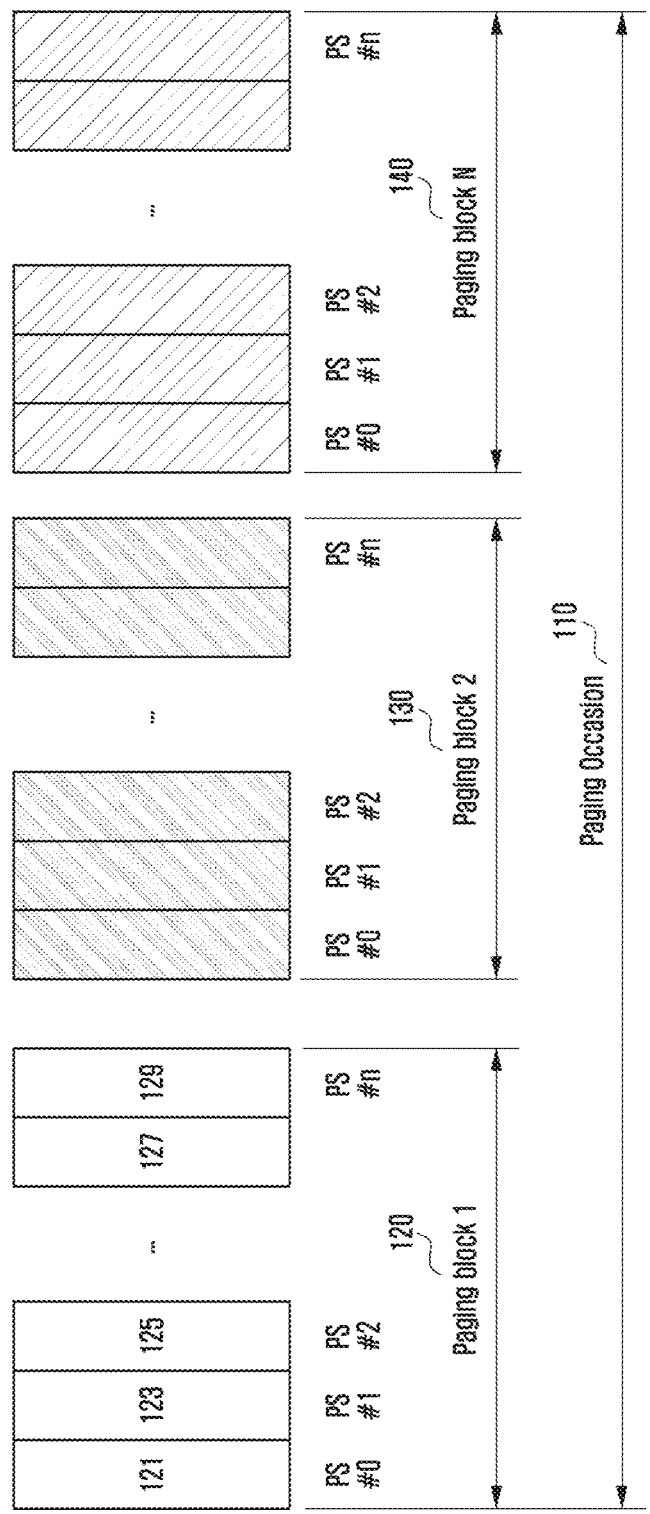
FIG. 1 illustrates an embodiment of paging channel design according to various embodiments of the present disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will be described in detail with reference to the accompanying drawings. In the following description, specific details such as detailed configurations and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separate into additional components and/or "units".

In addition, components and units may also be implemented to reproduce one or more CPUs within a device or a security multimedia card.

The terms as used in the present disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the present disclosure may not be interpreted as excluding embodiments of the present disclosure.

Herein, a base station performs resource allocation to a terminal. Examples of the base station may include an eNodeB (eNB), a Node B, gNodeB (gNB), transmission reception point (TRP), a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the present disclosure may be applied to other communication systems having similar technical backgrounds or channel forms.

A method of providing a generally high throughput and capacity includes a method of providing communication using a wider frequency band and a method of increasing frequency usage efficiency. However, it is very difficult to provide a higher average data rate through the latter method. This is because communication technologies of a current generation provide frequency usage efficiency close to a theoretical limit and thus, it is very difficult to increase the frequency usage efficiency up to that or more through a technical improvement. Accordingly, it can be said that a feasible method for increasing throughput and capacity is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 28 GHz or more. The signal transmitted on the high frequency band suffers from huge path losses and propagation losses compared to a signal transmitted on a frequency band of 2 GHz or lower used by the conventional cellular systems. This significantly reduces the coverage of a base station using the same power as the conventional cellular systems.

Beamforming techniques are used to mitigate the propagation path loss and to increase the propagation distance for communication at higher frequency. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

In the existing wireless communication system, the paging is transmitted to page UE which are attached to the wireless communication network but are in idle or inactive mode. In the idle or inactive mode UE wake ups at regular intervals (every paging DRX cycle) for short periods to receive paging and other broadcast information. In legacy system UE monitor one paging occasion (PO) every DRX cycle. One PO is a subframe/TTI of 1 ms duration. The paging message including UE ID of the paged UE is transmitted only in PO monitored by the paged UE. Network may configure several POs in a DRX cycle. The UE determines the UE's PO based on a UE ID. A UE first determines the paging frame (PF) and then determine the PO within the PF. One PF is radio frame (10 ms), which may contain one or multiple POs. Every radio frame in a DRX cycle can be paging frame. There can be up to four POs in a PF. The subframes which can be PO in a PF are pre-defined i.e. subframe #0, subframe #4, subframe #5 and subframe #9. The network (i.e. BS) signals two parameters. The first parameter is 'T' i.e. paging DRX cycle duration in radio frames. The second parameter is 'nB' i.e. number of POs in a paging DRX cycle. UEs are distributed across several 'nB' POs in the DRX cycle based on a UE ID. Several UEs can be mapped to same PO. The PF for a UE is the radio frame with system frame number 'SFN' which satisfies the equation SFN mod T=(T div N)*(UE_ID mod N); where N is equal to min (T, nB) and a UE_ID is equal to IMSI mod 1024. Within the determined PF, the PO corresponds to i_s=floor(UE_ID/N) mod Ns; where Ns is equal to max (1,nB/T); i_s can be 0, 1, 2 and 3. Mapping between i_s, Ns and subframe within paging frame is pre-defined. In a PO, paging message is transmitted using physical downlink shared channel (PDSCH). Physical downlink common control channel (PDCCH) is addressed to P-RNTI if there is a paging message in PDSCH. P-RNTI is common for all UEs. So, a UE identity (i.e. IMSI or S-TMSI) is included in paging message to indicate paging for a specific UE. Paging message may include multiple UE identities to page multiple UEs. Paging message is broadcasted (i.e. PDCCH is masked with P-RNTI) over data channel (i.e. PDSCH).

In case of high frequency band, paging needs to be transmitted using beamforming. At higher frequencies, beamforming is essential to compensate for path loss. One TX beam cannot provide the full cell coverage. Paging needs to be transmitted using the multiple transmission beams. In case of paging transmission/reception using beamforming, a system and method is needed to address issues such as definition of paging occasion, paging transmission mechanism in paging occasion, determination of paging occasion by a UE, determination of TX/RX beams for paging reception by a UE, determination of TX beams for paging transmission by network, and so on.

In the existing wireless communication system, UE monitors one paging occasion (PO) every paging DRX cycle wherein one PO has one time slot or paging time slot. The duration of time slot is 1 ms. In the present disclosure, UE monitors one PO every paging DRX cycle wherein one PO has one or more paging time slots. The number of paging time slots in PO is configured by network. The configuration can be signaled in system information and/or in dedicated RRC signaling. In a PO, the paging time slots can be contiguous or non-contiguous. For example, network can indicate that PO duration is 'n' time slots and each time slot is a paging time slot. Network can indicate that PO duration is 'n' time slots and also indicate which of these 'n' time slots are paging time slot (i.e. time slot in which paging is transmitted). The paging information (e.g. paging message and/or paging indicator) transmitted in each paging time slot of PO is same. The DL TX beam(s) used in each paging time slot can be different. The PO can also be referred as paging burst or paging burst set or PO interval or paging burst interval. The various embodiments illustrating the PO structure for transmitting paging using beamforming is explained below:

FIG. 1 illustrates an embodiment of paging channel design according to various embodiments of the present disclosure.

Each paging occasion (PO, 110) comprises of one or more paging blocks (120, 130 and 140). These paging blocks can be consecutive or staggered. Each paging block comprises of one or more paging slots (121, 123, 125, 127 and 129). These paging slots can be consecutive or staggered.

In an embodiment, there can be N consecutive paging blocks in a PO and one or more paging block(s) amongst these which carry paging can be signaled or pre-defined. N can be signaled by network in RRC signaling or in BCH or in system information or can be pre-defined. Alternately, PO duration and duration of each paging block can be signaled by network in RRC signaling or in BCH or in system information. Number of paging blocks is equal to PO duration divided by duration of each paging block. Alternately, PO duration and N can be signaled by network. In this case there are N consecutive paging blocks and PO duration can be greater than N*length of each paging block. A bit map can be used to signal which paging block amongst the N paging blocks in PO are used for paging. Alternately, paging block number (each paging block in PO can be sequentially numbered starting from zero) can be used to explicitly indicate paging block(s) used for paging. Paging block which carry paging can be at a fixed offset from synchronization signal (SS) block carrying other signals (such as primary synchronization signal/secondary synchronization signal/extended synchronization signal/broadcast channel PSS/SSS/ESS/BCH), etc.).

In an alternate embodiment, there can be N paging blocks in a PO where N is signaled by network in RRC signaling or in BCH or in system information or can be pre-defined. The first paging block (120) starts from the start of PO (110). There is an offset between paging blocks and is signaled by network in RRC signaling or in BCH or in system information or can be pre-defined. The offset between paging blocks can also be zero. In case offset between paging blocks is zero the offset may or may not be signaled by network. PO duration can also be signaled by network in RRC signaling or in BCH or in system information.

In an alternate embodiment, there can be N paging blocks in a PO where N is signaled by network in RRC signaling or in BCH or in system information or can be pre-defined. The first paging block (120) starts at an offset from the start of PO (110) and is signaled by network in RRC signaling or in BCH or in system information. There is an offset between paging blocks in PO and is signaled by network in RRC signaling or in BCH or in system information or can be pre-defined. The offset between paging blocks can also be zero. In case offset between paging blocks is zero the offset may or may not be signaled by network. The offset between paging blocks and offset between start of PO and first paging block can be same. PO duration can also be signaled by network in RRC signaling or in BCH or in system information.

In an alternate embodiment, there can be N paging blocks in a PO. Network signals the PO duration and duration of paging block in RRC signaling or in BCH or in system information. Number of paging blocks is equal to PO duration divided by 'offset+duration of each paging block'. The first paging block (120) starts at an offset from the start of PO (110) and is signaled by network in RRC signaling or in BCH or in system information. There is an offset between paging blocks in PO and is signaled by network in RRC signaling or in BCH or in system information or can be pre-defined. The offset between paging blocks can also be zero. In case offset between paging blocks is zero the offset may or may not be signaled by network. The offset between paging blocks and offset between start of PO and first paging block can be same.

In an alternate embodiment, there can be N paging blocks in a PO. Network signals the PO duration, duration of paging block and paging block period in RRC signaling or in BCH or in system information. One paging block is there every paging block period in PO. Paging block period starts from start of PO. Number of paging blocks is equal to PO duration divided by 'paging block period'.

In an embodiment, there can be N consecutive paging blocks in a PO and all paging block(s) carry paging.

Each paging slot (PS, 121, 123, 125, 127 and 129) comprises of one or more orthogonal frequency division multiplexing OFDM) symbols. The number of OFDM symbols in each PS can be pre-defined or signaled by network in RRC signaling or in BCH or in system information. The number of PSs in each paging block can be pre-defined or signaled by network in RRC signaling or in BCH or in system information. Alternately number of PSs is equal to paging block duration divided by duration of each PS. These PSs can be consecutive or staggered in a paging block. Similar to signaling mechanism to indicate which paging blocks in a PO are used for paging, PSs in a paging block used for paging can be signaled as explained above.

In an embodiment of FIG. 1, other signals (such as PSS/SSS/ESS/BCH, etc.) can be transmitted frequency division multiplexing (FDM)/code division multiplexing (CDM)/time division multiplexing (TDM) together with paging in PS. Paging can be transmitted in specific physical resource block (PRB)s or all PRBs in each PS. If paging is transmitted in specific PRBs then these PRBs can be pre-defined or signaled by network in RRC signaling or in BCH or in system information.

Paging information (e.g. paging message) is transmitted using one or more DL TX beams in each PS. Mapping between PS and DL TX beam(s) can be pre-defined or signaled by network in RRC signaling or in BCH or in system information. Alternately, mapping between PS(s) and SS block(s) can be pre-defined (e.g. SS block 1 mapped to PS1, SS block 2 mapped to PS 2 and so on) or signaled. Each PS can be mapped to one or more SS blocks or DL TX beams. Alternately, mapping between paging block(s) and DL TX beam(s) can be pre-defined or signaled. Alternately, mapping between paging block and SS block(s) can be pre-defined (e.g. SS block 1 mapped to paging block 1, SS block 2 mapped to paging block 2 and so on) or signaled. Each paging block can be mapped to one or more SS blocks or DL TX beams. In an embodiment, network may indicate whether DL TX beams used for transmission of PSS/SSS/PBCH is quasi-collocated (QCL) with those used for transmission of paging or not. If not, then UE monitors all paging slots in PO. If yes, then a UE can identify the paging slot(s) or paging block(s) corresponding to best/suitable DL TX beam or SS block and only monitor that. If a UE is able to receive synchronization signals and/or broadcast channel successfully from multiple DL TX beams then TX beam with strongest signal quality is the best DL TX beam. If the signal quality of received signal from a DL TX beam is above a certain threshold then the signal quality of received signal is a suitable DL TX beam. The threshold can be signaled by network in system information. If a UE is able to receive synchronization signals and/or broadcast channel successfully from multiple SS blocks, then SS block in which the UE has received signals with strongest signal quality is the best SS block. If the signal quality of received signal from a SS block is above a certain threshold then the signal quality of received signal is a suitable SS block. The threshold can be signaled by network in system information.

In each PS one or more paging channels can be transmitted. Each paging channel can be of fixed size (e.g. transmitted over fixed number of PRBs). This can reduce decoding complexity. Alternately paging channel can be of variable size which is signaled by the PDCCH or MAC/RRC signaling for example, if the size changes semi-statically. The paging block in this embodiment can also be a subframe or set of subframes.

Figure 2:
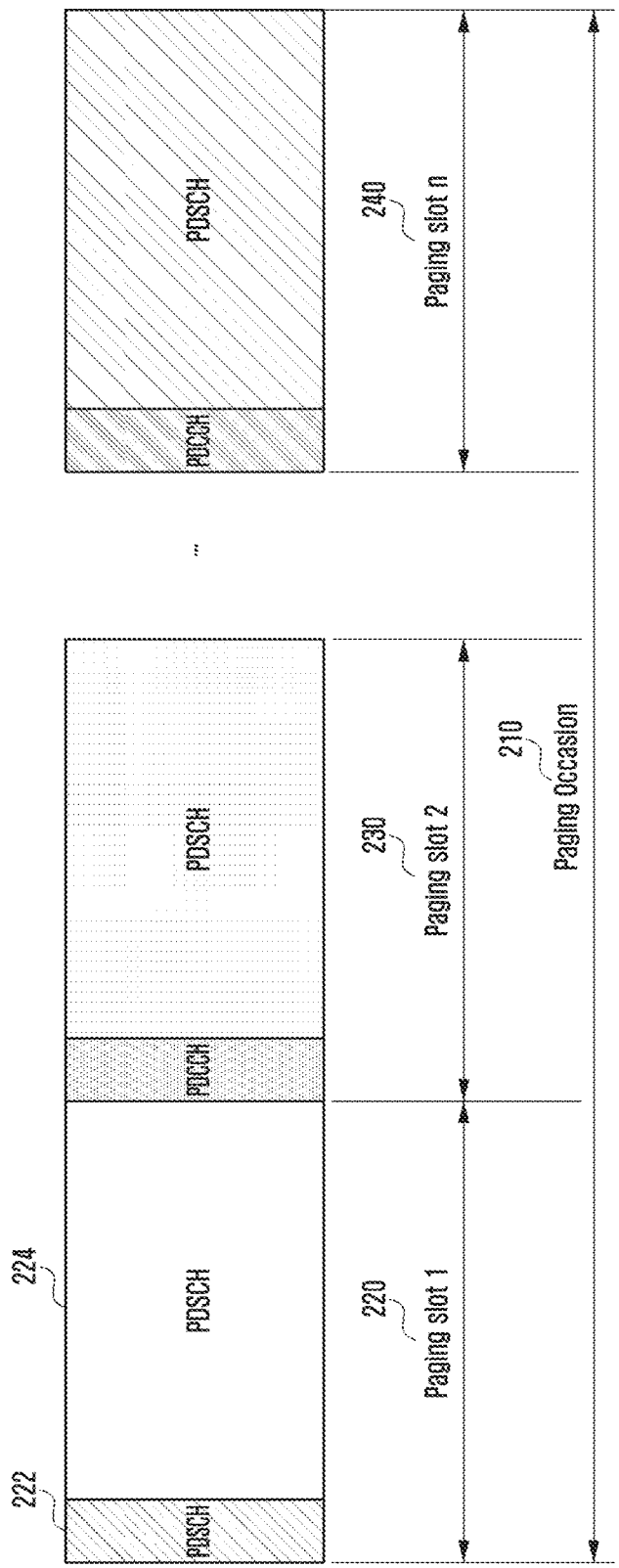
FIG. 2 illustrates another embodiment of paging channel design according to various embodiments of the present disclosure.

FIG. 2 illustrates another embodiment of paging channel design according to various embodiments of the present disclosure.

Each paging occasion comprises of one or more paging slots. These paging slots can be consecutive or staggered. All paging slots in PO carry paging. Alternately, paging slot which carry paging in PO can be signaled or pre-defined in RRC signaling or in BCH or in system information. The duration of paging slot can be pre-defined or signaled by network in RRC signaling or in BCH or in system information.

In an embodiment, there can be N consecutive paging slots (220, 230 and 240) in a PO (210) and one or more paging slots amongst these which carry paging can be signaled or pre-defined in RRC signaling or in BCH or in system information. N can be signaled by network in RRC signaling or in BCH or in system information or can be pre-defined. Alternately, PO duration can be signaled by network in RRC signaling or in BCH or in system information. Number of paging slots is equal to PO duration divided by duration of each paging slot. Duration of paging slot can be pre-defined or can also be signaled by network RRC signaling or in BCH or in system information. Alternately, PO duration and N can be signaled by network. In this case there are N consecutive paging slots and PO duration can be greater than N*length of each paging slot. A bit map can be used to signal which paging slots amongst the N consecutive paging slots in PO are used for paging. Alternately, paging slot number (each paging slot in PO can be sequentially numbered starting from zero) can be used to explicitly indicate paging slots used for paging. Paging slot which carry paging can be at a fixed offset from SS block carrying other signals (such as PSS/SSS/ESS/BCH, etc.).

In an alternate embodiment, there can be N paging slots (220, 230 and 240) in a PO (210) where N is signaled by network in RRC signaling or in BCH or in system information or can be pre-defined. The first paging slot (220) starts from the start of PO (210). There is an offset between paging slots and is signaled by network in RRC signaling or in BCH or in system information. The offset between paging slots can also be zero. In case offset between paging slots is zero the offset may or may not be signaled by network. PO duration can also be signaled by network in RRC signaling or in BCH or in system information.

In an alternate embodiment, there can be N paging slots (220, 230 and 240) in a PO (210) where N is signaled by network in RRC signaling or in BCH or in system information or can be pre-defined. The first paging slot (220) starts at an offset from the start of PO (210) and offset is signaled by network in RRC signaling or in BCH or in system information or can be pre-defined. There is an offset between paging slots in PO and is signaled by network in RRC signaling or in BCH or in system information or can be pre-defined. The offset between paging slots can also be zero. In case offset between paging slots is zero the offset may or may not be signaled by network. The offset between paging slots and offset between start of PO and first paging slot can be same. PO duration can also be signaled by network in RRC signaling or in BCH or in system information.

In an alternate embodiment, there can be N paging slots (220, 230 and 240) in a PO (210). Network signals the PO duration and duration of paging slot in RRC signaling or in BCH or in system information. Number of paging slots is equal to PO duration divided by 'offset+duration of each paging slot. The first paging slot (220) starts at an offset from the start of PO (210) and offset is signaled by network in RRC signaling or in BCH or in system information or can be pre-defined. There is an offset between paging slots in PO and is signaled by network in RRC signaling or in BCH or in system information or can be pre-defined. The offset between paging slots can also be zero. In case offset between paging slots is zero the offset or may not be signaled by network. The offset between paging slots and offset between start of PO and first paging slot can be same.

In an alternate embodiment, there can be N paging slots in a PO. Network signals the PO duration, duration of paging slot and paging slot period in RRC signaling or in BCH or in system information. One paging slot is there every paging slot period in PO. Paging slot period starts from start of PO. Number of paging slots is equal to PO duration divided by 'paging slot period'.

Paging is transmitted using PDCCH/EPDCCH/xPDCCH (222) and PDSCH (224) in a paging slot. Guard band and PUSCH/PUCCH region may also be there in paging slot. In a paging slot, PDCCH/EPDCCH/xPDCCH (222) masked with P-RNTI indicates that paging is there in PDSCH (224). PDCCH/EPDCCH/xPDCCH (222) and PDSCH (224) in paging slot are transmitted using one or more DL TX beams. The P-RNTI can be common for all UEs. Alternately there can be several P-RNTIs. A UE selects a P-RNTI based on the UE's UE ID. A UE selects the ith P-RNTI in list of P-RNTIs where i=UE_ID mod P where 'P' is number of P-RNTIs in the list. P-RNTI to be used by a UE can also be assigned to a UE. The list of P-RNTIs can be pre-defined or signaled by network in RRC signaling or in BCH or in system information.

Paging information (e.g. paging message) is transmitted using one or more DL TX beams in each paging slot. Same paging information is transmitted in each paging slot of PO. The mapping between paging slots and DL TX beam(s) can be pre-defined or signaled in a broadcast or dedicated manner. Alternately, mapping between paging slots and SS block(s) can be pre-defined (e.g. SS block 1 mapped to PS1, SS block 2 mapped to PS 2 and so on) or signaled. Each paging slot can be mapped to one or more SS blocks or DL TX beams. In an embodiment, network may indicate whether DL TX beams used for transmission of PSS/SSS/PBCH is quasi-collocated (QCL) with those used for transmission of paging or not. If not, then a UE monitors all paging slots in PO. If yes, then a UE can identify the paging slot(s) corresponding to best/suitable DL TX beam or SS block and only monitor that. If a UE is able to receive synchronization signals and/or broadcast channel successfully from multiple DL TX beams then TX beam with strongest signal quality is the best DL TX beam. If the signal quality of received signal from a DL TX beam is above a certain threshold then the signal quality of received signal is a suitable DL TX beam. The threshold can be signaled by network in system information. If a UE is able to receive synchronization signals and/or broadcast channel successfully from multiple SS blocks, then SS block in which the UE has received signals with strongest signal quality is the best SS block. If the signal quality of received signal from a SS block is above a certain threshold then the signal quality of received signal is a suitable SS block. The threshold can be signaled by network in system information.

Figure 3:
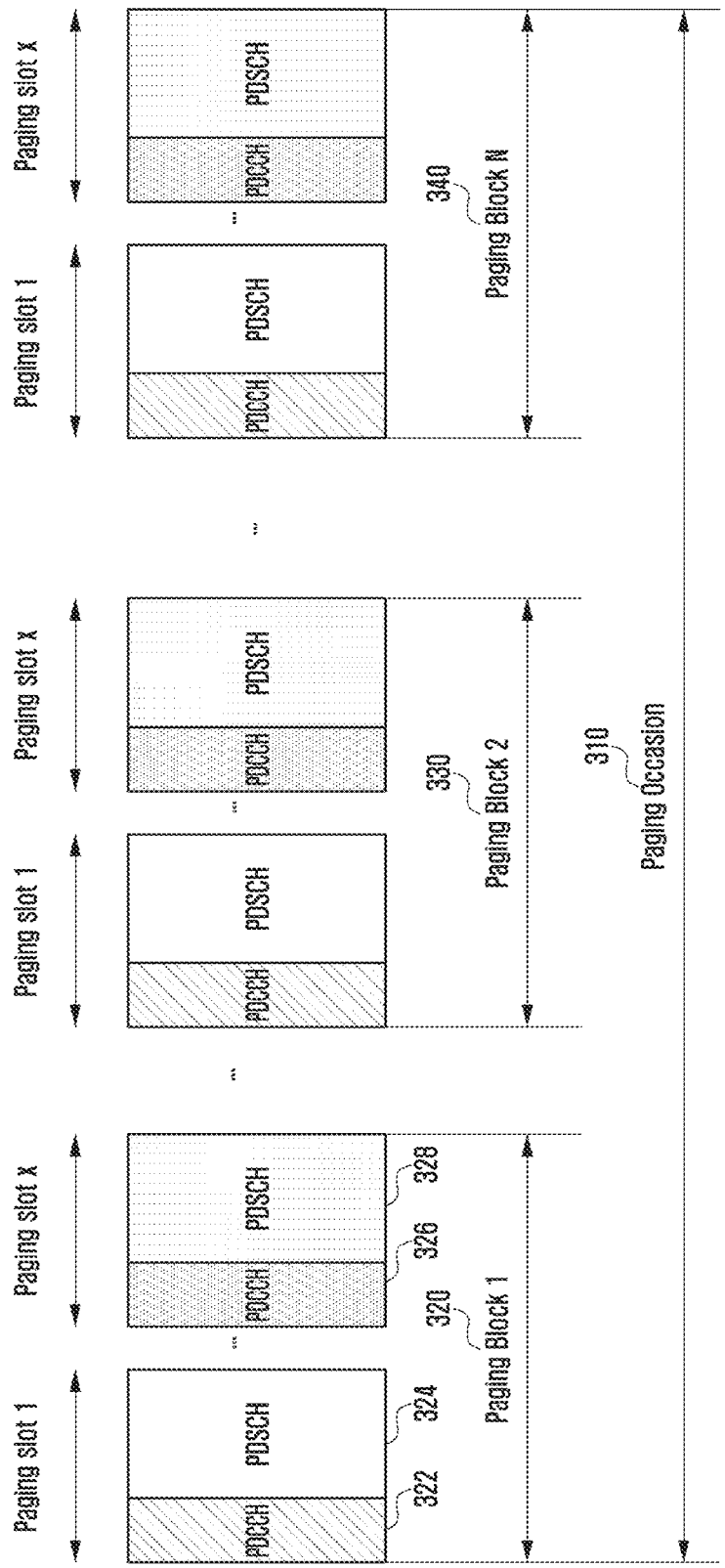
FIG. 3 illustrates yet another embodiment of paging channel design according to various embodiments of the present disclosure.

FIG. 3 illustrates another embodiment of paging channel design according to various embodiments of the present disclosure.

Each paging occasion (PO, 310) comprises of one or more paging blocks (320, 330 and 340). These paging blocks can be consecutive or staggered. Each paging block comprises of one or more paging slots (322, 324, 326 and 328). These paging slots can be consecutive or staggered in a paging block.

In an embodiment, there can be N consecutive paging blocks in a PO and one or more paging block(s) amongst these which carry paging can be signaled or pre-defined. N can be signaled by network in RRC signaling or in BCH or in system information or can be pre-defined. Alternately, PO duration and duration of each paging block can be signaled by network in RRC signaling or in BCH or in system information. Number of paging blocks is equal to PO duration divided by duration of each paging block. Alternately, PO duration and N can be signaled by network. In this case there are N consecutive paging blocks and PO duration can be greater than N*length of each paging block. A bit map can be used to signal which paging block amongst the N consecutive paging blocks in PO are used for paging. Alternately, paging block number (each paging block in PO is sequentially numbered starting from zero) can be used to explicitly indicate paging block(s) used for paging. Paging block which carry paging can be at a fixed offset from SS block carrying other signals (such as PSS/SSS/ESS/BCH, etc.).

In an alternate embodiment, there can be N paging blocks in a PO where N is signaled by network in RRC signaling or in BCH or in system information or can be pre-defined. The first paging block (320) starts from the start of PO (310). There is an offset between paging blocks and is signaled by network in RRC signaling or in BCH or in system information or can be pre-defined. The offset between paging blocks can also be zero. In case offset between paging blocks is zero the offset may or may not be signaled by network. PO duration can also be signaled by network in RRC signaling or in BCH or in system information.

In an alternate embodiment, there can be N paging blocks in a PO where N is signaled by network in RRC signaling or in BCH or in system information or can be pre-defined. The first paging block (320) starts at an offset from the start of PO (310). There is an offset between paging blocks in PO and is signaled by network in RRC signaling or in BCH or in system information or can be pre-defined. The offset between paging blocks can also be zero. In case offset between paging blocks is zero the offset may or may not be signaled by network. The offset between paging blocks and offset between start of PO and first paging block can be same. PO duration can also be signaled by network in RRC signaling or in BCH or in system information.

In an alternate embodiment, there can be N paging blocks in a PO. Network signals the PO duration and duration of paging block in RRC signaling or in BCH or in system information. Number of paging blocks is equal to PO duration divided by 'offset+duration of each paging block'. The first paging block (120) starts at an offset from the start of PO (110) and is signaled by network in RRC signaling or in BCH or in system information. There is an offset between paging blocks in PO and is signaled by network in RRC signaling or in BCH or in system information or can be pre-defined. The offset between paging blocks can also be zero. In case offset between paging blocks is zero the offset may or may not be signaled by network. The offset between paging blocks and offset between start of PO and first paging block can be same.

In an alternate embodiment, there can be N paging blocks in a PO. Network signals the PO duration, duration of paging block and paging block period in RRC signaling or in BCH or in system information. One paging block is there every paging block period in PO. Paging block period starts from start of PO. Number of paging blocks is equal to PO duration divided by 'paging block period'.

In an embodiment, there can be N consecutive paging blocks in a PO and all paging block(s) carry paging.

Paging is transmitted using PDCCH/EPDCCH/xPDCCH (322, 326) and PDSCH (324, 328) in each paging slot in a paging block (320). Guard band and PUSCH/PUCCH region may also be there in paging slot. In a paging slot, PDCCH/EPDCCH/xPDCCH (322, 326) masked with P-RNTI indicates that paging is there in PDSCH (324, 328). PDCCH/EPDCCH/xPDCCH (322, 326) and PDSCH (324, 328) in paging slot are transmitted using one or more DL TX beams. The P-RNTI can be common for all UEs. Alternately there can be several P-RNTIs. A UE selects a P-RNTI based on the UE's UE ID. A UE selects the ith P-RNTI in list of P-RNTIs where i=UE ID mod P where 'P' is number of P-RNTIs in the list. P-RNTI to be used by a UE can also be assigned to the UE. The list of P-RNTIs can be pre-defined or signaled by network in RRC signaling or in BCH or in system information. The number of PSs in each paging block can be pre-defined or signaled by network in RRC signaling or in BCH or in system information. Alternately number of PSs is equal to paging block duration divided by duration of each PS. These PSs can be consecutive or staggered in a paging block. Similar to signaling mechanism to indicate which paging blocks in a PO are used for paging, PSs in a paging block used for paging can be signaled as explained above.

Other signals (such as PSS/SSS/ESS/BCH, etc.) can be transmitted (FDM/CDM/TDM) together with paging in PS. Paging can be transmitted in specific PRBs or all PRBs in each PS. If paging is transmitted in specific PRBs then these PRBs can be pre-defined or signaled by network in RRC signaling or in BCH or in system information.

Paging information (e.g. paging message) is transmitted using one or more DL TX beams in each PS. The same paging information is transmitted in each PS of PO. The mapping between PS and DL TX beam(s) can be pre-defined or signaled. Alternately, mapping between PS and SS block(s) can be pre-defined (e.g. SS block 1 mapped to PS1, SS block 2 mapped to PS 2 and so on) or signaled. Alternately, mapping between paging block and DL TX beam(s) can be pre-defined or signaled. Alternately, mapping between paging block and SS block(s) can be pre-defined (e.g. SS block 1 mapped to paging block 1, SS block 2 mapped to paging block 2 and so on) or signaled. Each paging slot can be mapped to one or more SS blocks or DL TX beams. In an embodiment, network may indicate whether DL TX beams used for transmission of PSS/SSS/PBCH is quasi-collocated (QCL) with those used for transmission of paging or not. If not, then a UE monitors all paging slots in PO. If yes, then the UE can identify the paging slot(s) corresponding to best/suitable DL TX beam or SS block and only monitor that. If a UE is able to receive synchronization signals and/or broadcast channel successfully from multiple DL TX beams then TX beam with strongest signal quality is the best DL TX beam. If the signal quality of received signal from a DL TX beam is above a certain threshold then the signal quality of received signal is a suitable DL TX beam. The threshold can be signaled by network in system information. If a UE is able to receive synchronization signals and/or broadcast channel successfully from multiple SS blocks, then SS block in which it received signals with strongest signal quality is the best SS block. If the signal quality of received signal from a SS block is above a certain threshold then the signal quality of received signal is a suitable SS block. The threshold can be signaled by network in system information.

The paging block in this embodiment can also be a subframe or set of subframes.

Figure 4:
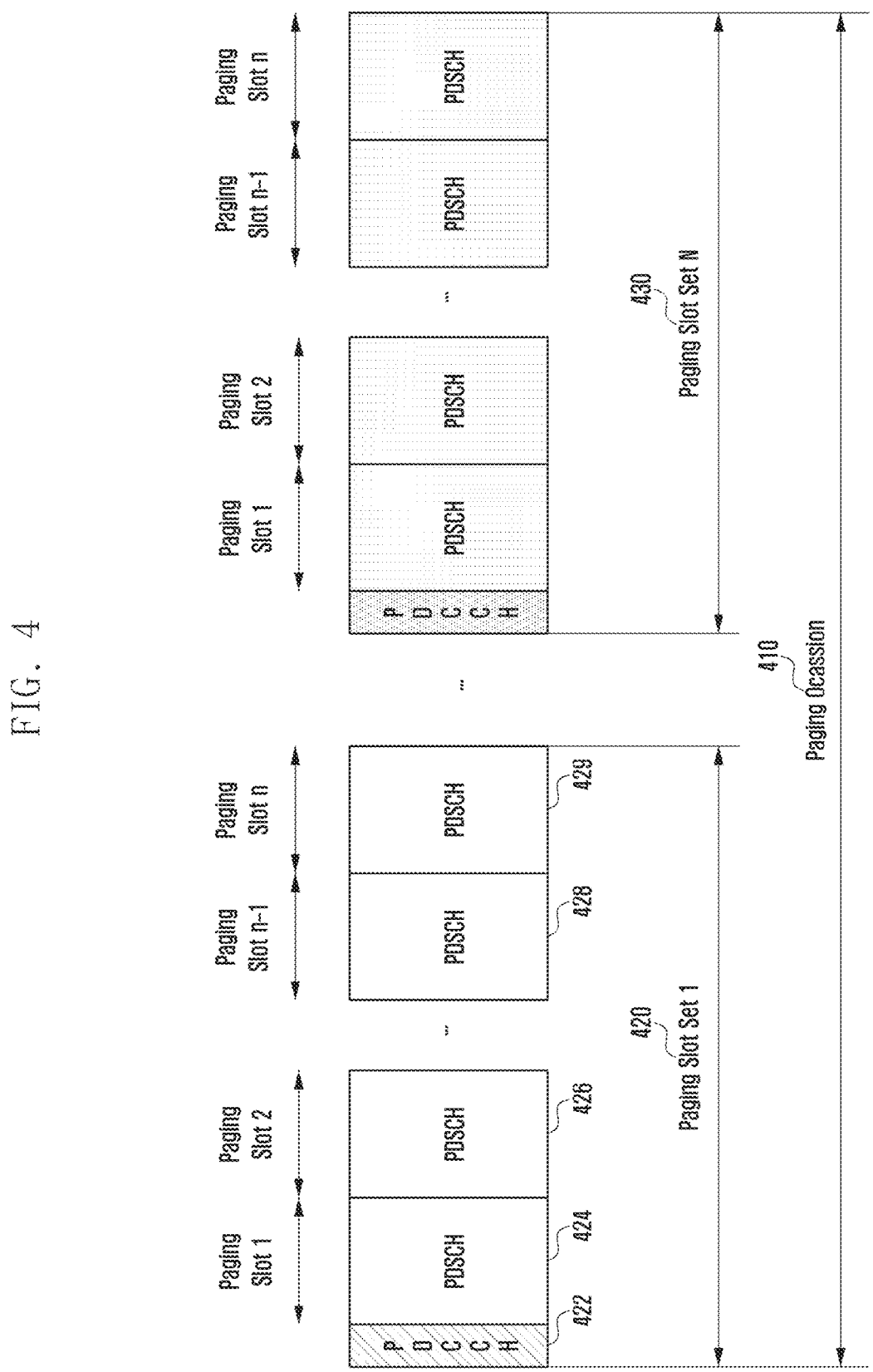
FIG. 4 illustrates yet another embodiment of paging channel design according to various embodiments of the present disclosure.

FIG. 4 illustrates another embodiment of paging channel design according to various embodiments of the present disclosure.

Each paging occasion (410) comprises of one or more paging slot set (420, 430). These paging slot sets can be consecutive or staggered. Each paging slot set (420) consists of one or more paging slots (424, 426, 428 and 429). Paging slot set which carry paging can be signaled or pre-defined.

In an embodiment, there can be N consecutive paging slot sets in a PO and one or more paging slot sets amongst these which carry paging can be signaled or pre-defined in RRC signaling or in BCH or in system information. N can be signaled by network in RRC signaling or in BCH or in system information or can be pre-defined. Alternately, PO duration and duration of each paging slot set can be signaled by network in RRC signaling or in BCH or in system information. Number of paging slot sets is equal to PO duration divided by duration of each paging slot set. A bit map can be used to signal which paging slot set amongst the N consecutive paging slots in PO are used for paging. Alternately, paging slot set number (each paging slot set in PO is sequentially numbered starting from zero) can be used to explicitly indicate paging slot sets used for paging. Paging slot set which carry paging can be at a fixed offset from SS block carrying other signals (such as PSS/SSS/ESS/BCH, etc.).

In an alternate embodiment, there can be N paging slot set in a PO where N is signaled by network in RRC signaling or in BCH or in system information or can be pre-defined. N can be one also. The first paging slot set (420) starts from the start of PO (40). There is an offset between paging slot set and is signaled by network in RRC signaling or in BCH or in system information. The offset between paging slot sets can also be zero. In case offset between paging slot sets is zero the offset may or may not be signaled by network.

In an alternate embodiment, there can be N paging slot sets in a PO where N is signaled by network in RRC signaling or in BCH or in system information or can be pre-defined. N can be one also. The first paging slot set (420) starts at an offset from the start of PO (410). There is an offset between paging slot set in PO and is signaled by network in RRC signaling or in BCH or in system information or can be pre-defined. The offset can also be zero. In case offset between paging slot sets is zero the offset may or may not be signaled by network. The offset between paging slot sets and offset between start of PO and first paging slot set can be same.

In an alternate embodiment, there can be N paging slot sets in a PO. Network signals the PO duration and duration of paging slot set in RRC signaling or in BCH or in system information. Number of paging slot sets is equal to PO duration divided by "offset+duration of each paging slot set." The first paging slot set (420) starts at an offset from the start of PO (410). There is an offset between paging slot set in PO and is signaled by network in RRC signaling or in BCH or in system information or can be pre-defined. The offset can also be zero. In case offset between paging slot sets is zero the offset may or may not be signaled by network. The offset between paging slot sets and offset between start of PO and first paging slot set can be same.

In an alternate embodiment, there can be N paging slot sets in a PO. Network signals the PO duration, duration of paging slot set and paging slot set period in RRC signaling or in BCH or in system information. One paging slot set is there every paging slot set period in PO. Paging slot set period starts from start of PO. Number of paging slot sets is equal to PO duration divided by "paging slot set period."

Paging is transmitted using PDCCH/EPDCCH/xPDCCH (422) and PDSCH (424, 426, 428 and 429). PDCCH/EPDCCH/xPDCCH (422) indicates each of resources for PDSCH (424, 426, 428 and 429) in multiple paging slots. In a paging slot set (420), PDCCH/EPDCCH/xPDCCH (422) masked with P-RNTI indicates that paging is there in PDSCH (424, 426, 428 and 429) of specific paging slot. PDCCH/EPDCCH/xPDCCH (422) in paging slot set is transmitted using one or more DL TX beams in TDM and/or FDM manner. PDSCH (424, 426, 428 and 429) in a paging slot are transmitted using one or more DL TX beams. The P-RNTI can be common for all UEs. Alternately there can be several P-RNTIs. A UE selects a P-RNTI based on the UE's UE ID. A UE selects the ith P-RNTI in list of P-RNTIs where i=UE ID mod P where 'P' is number of P-RNTIs in the list. P-RNTI to be used by a UE can also be assigned to the UE. The list of P-RNTIs can be pre-defined or signaled by network in RRC signaling or in BCH or in system information.

Paging information (e.g. paging message) is transmitted using one or more DL TX beams in each PS. The same paging information is transmitted in each PS of PO. The, mapping between paging slot set and DL TX beam(s) can be pre-defined or signaled in a broadcast or dedicated manner. Alternately, mapping between paging slot set and SS block(s) can be pre-defined (e.g. SS block 1 mapped to paging slot set 1, SS block 2 mapped to paging slot set 2 and so on) or signaled. In an embodiment, network may indicate whether DL TX beams used for transmission of PSS/SSS/PBCH is quasi-collocated (QCL) with those used for transmission of paging or not. If not, then a UE monitors all paging slot sets in PO. If yes, then a UE can identify the paging slot set(s) corresponding to best/suitable DL TX beam or SS block and only monitor that.

Figure 5:
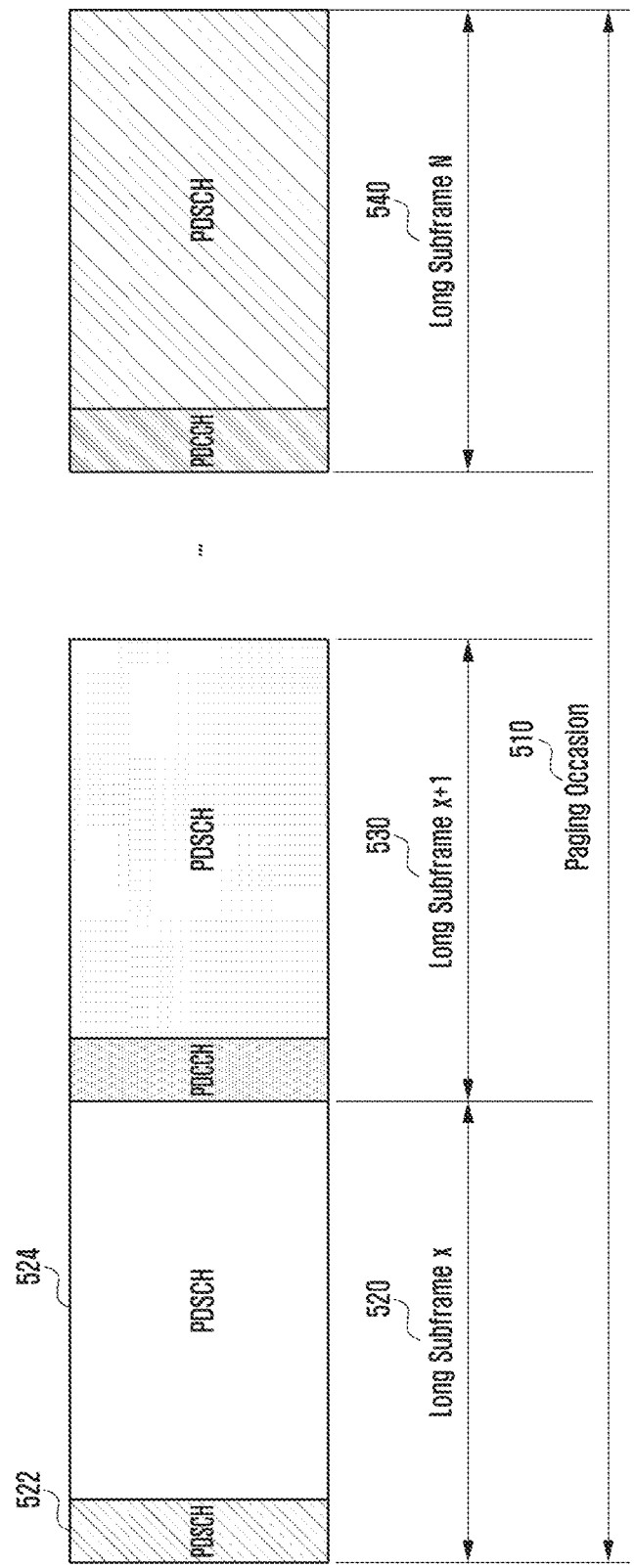
FIG. 5 illustrates yet another embodiment of paging channel design according to various embodiments of the present disclosure.

FIG. 5 illustrates another embodiment of paging channel design according to various embodiments of the present disclosure.

Each paging occasion (510) comprises of one or more long subframes (520, 530, 540). Size of each long subframe is multiple of subframe size. These subframes can be consecutive or staggered. Subframe which carry paging can be signaled or pre-defined. Paging is transmitted using PDCCH/EPDCCH/xPDCCH (522) and PDSCH (524) in a subframe. In a subframe, PDCCH/EPDCCH/xPDCCH (522) masked with P-RNTI indicates that paging is there in PDSCH (524). PDCCH (522) and PDSCH (524) in subframe are transmitted using one or more DL TX beams. Mapping between paging subframe and beam(s) can be pre-defined or signaled.

The grant allocation (DCI formats) for such long subframes is defined to account for the size of the subframe. Alternatively, the grant allocation is scaled proportional to the size of the subframe in the units of normal subframe size.

In order to receive the paging message transmitted using beam sweeping, a UE has to monitor increased number of time slots for paging as PO consists of several time slots for TX beam sweeping. This leads to increase the UE's power consumption. To solve this problem, embodiments to minimize the UE's power consumption for receiving paging are described below.

Figure 6:
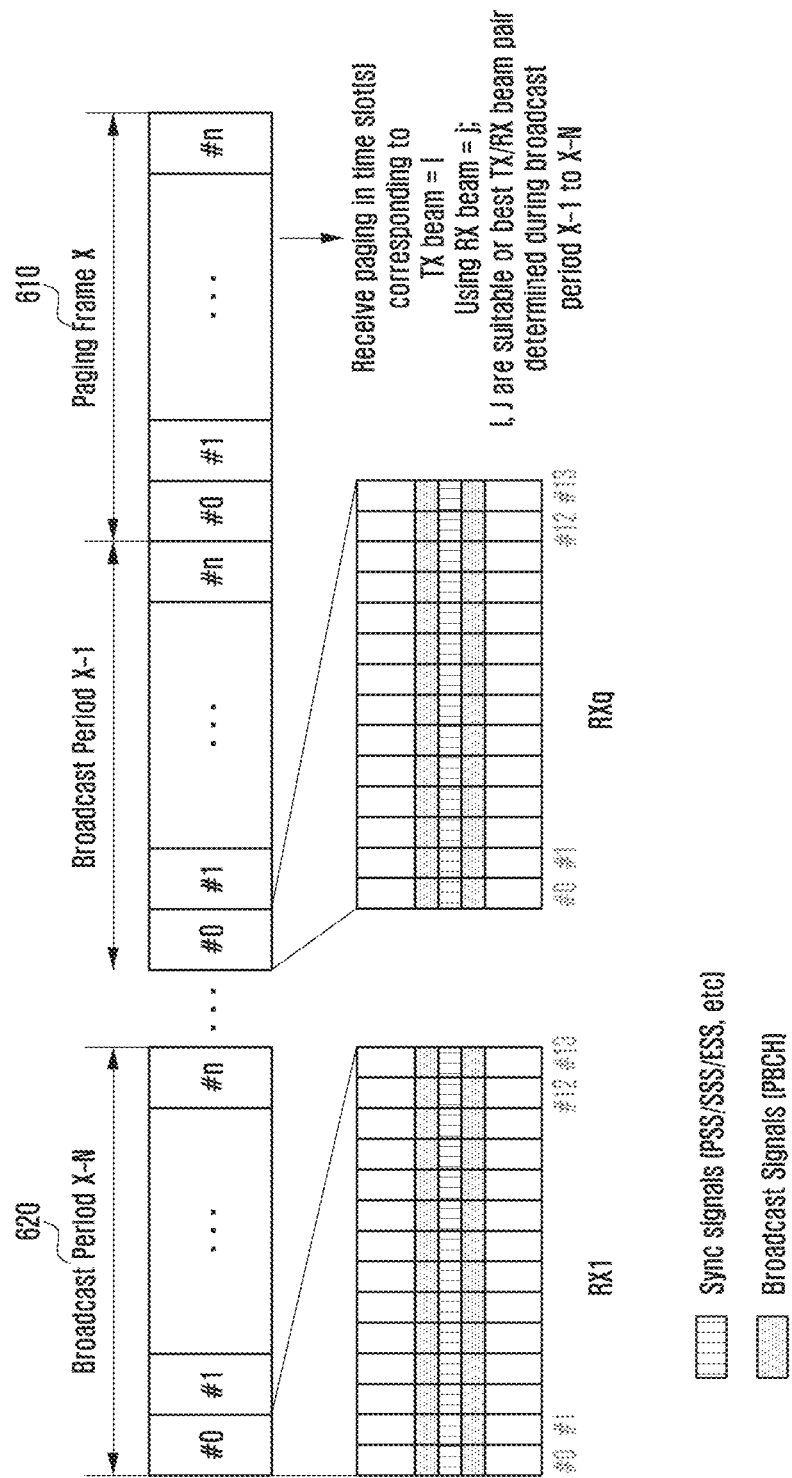
FIG. 6 illustrates an embodiment of receiving a paging according to various embodiments of the present disclosure.
Figure 7:
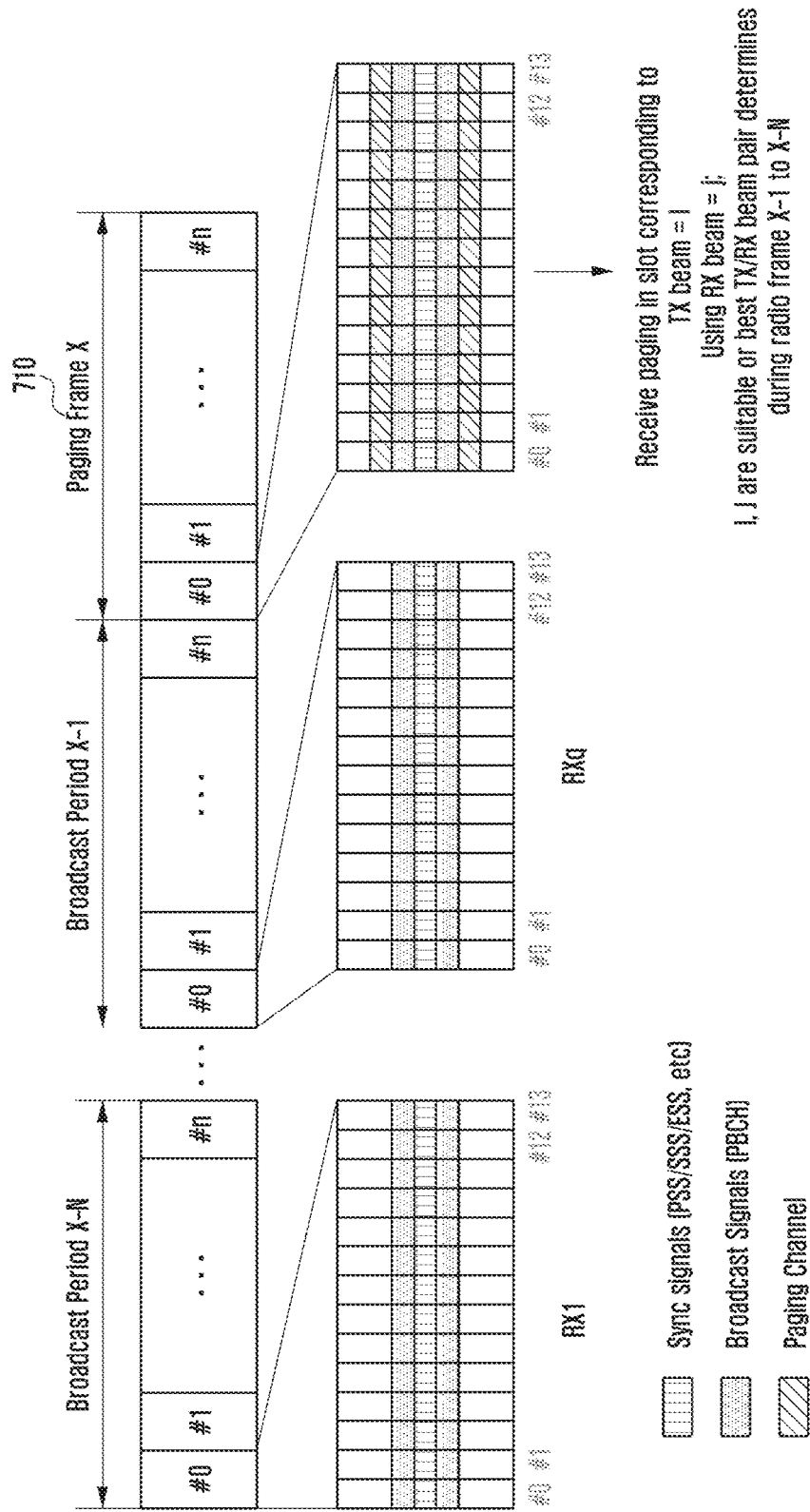
FIG. 7 illustrates another embodiment of receiving a paging according to various embodiments of the present disclosure.

FIG. 6 and FIG. 7 illustrate an embodiment of receiving a paging according to various embodiments of the present disclosure.

The embodiment illustrated in FIGS. 6 and 7 of the method to minimize UE's power consumption is as follows: In this embodiment, based on the configured DRX cycle, a UE determines the start of paging frame or paging occasion or paging burst in which paging is transmitted for the UE. A UE wakes up "N" broadcast periods before the start of paging frame or paging occasion or paging burst (610). The broadcast period (620) is the interval over which BS/eNB/TRP completes one full TX beam sweeping for synchronization signals (such as PSS/SSS/ESS) and broadcast channel (PBCH) transmission. "N" is the number of RX beams in a UE. During the "N" broadcast periods a UE tries to receive synchronization signals and broadcast channel transmitted using plurality of TX beams using plurality of RX beams. A UE determines the suitable or best TX/RX beam pair. Suitable TX beam is the DL TX beam corresponding to synchronization signals and/or broadcast channel successfully received by a UE. Suitable or best RX beam is the RX beam which was used to successfully receive synchronization signals and/or broadcast channel. If a UE is able to receive synchronization signals and/or broadcast channel successfully from multiple DL TX beams then TX beam with strongest signal quality is the best DL TX beam. If the signal quality (or signal strength) of received signal from a DL TX beam is above a certain threshold then the signal quality of received signal is a suitable DL TX beam. The threshold can be signaled by network in system information.

In the paging frame or paging occasion or paging burst (610), a UE receives the paging as follows:

a) a UE monitors the time slot (s) corresponding to suitable and or best DL TX beam using the suitable or best RX beam. Mapping between time slot(s) and DL TX beam(s) can be signaled by network or can be pre-defined. A UE checks for PDCCH/EPDCCH/xPDCCH corresponding to paging RNTI. If PDCCH/EPDCCH/XPDCCH corresponding to paging RNTI is received, A UE receives the Paging message in PDSCH using the information in the received PDCCH/EPDCCH/XPDCCH. PDCCH/EPDCCH/XPDCCH may indicate resources for multiple time slots and a UE receives paging in PDSCH in these time slots as described from FIG. 2 to FIG. 5. This procedure is illustrated in FIG. 6.

b) a UE monitors the paging slots corresponding to suitable and or DL TX beam using the RX beam in the paging frame or paging occasion or paging burst (710). Paging frame or paging occasion or paging burst (710) can have many paging slots. Paging slot comprises of one or more OFDM symbols. The paging frame or paging occasion or paging burst (710) can be same as frame or paging occasion or burst in which synchronization signals (PSS/SSS/ESS) and broadcast channel (PBCH) is transmitted or the paging frame or paging occasion or paging burst (710) can be another paging frame or paging occasion or paging burst pre-defined or signaled by network. Differently from the procedure in FIG. 6, a mapping between paging slots in paging frame or paging occasion or paging burst and DL TX beam can be signaled by network or can be pre-defined. This procedure is illustrated in FIG. 7. In the case when the paging frame or paging occasion or paging burst is same as frame or occasion or burst (710) in which synchronization signals (PSS/SSS/ESS) and broadcast channel (PBCH) is transmitted, a UE can wakeup 'N–1' broadcast periods instead of N.

Figure 8:
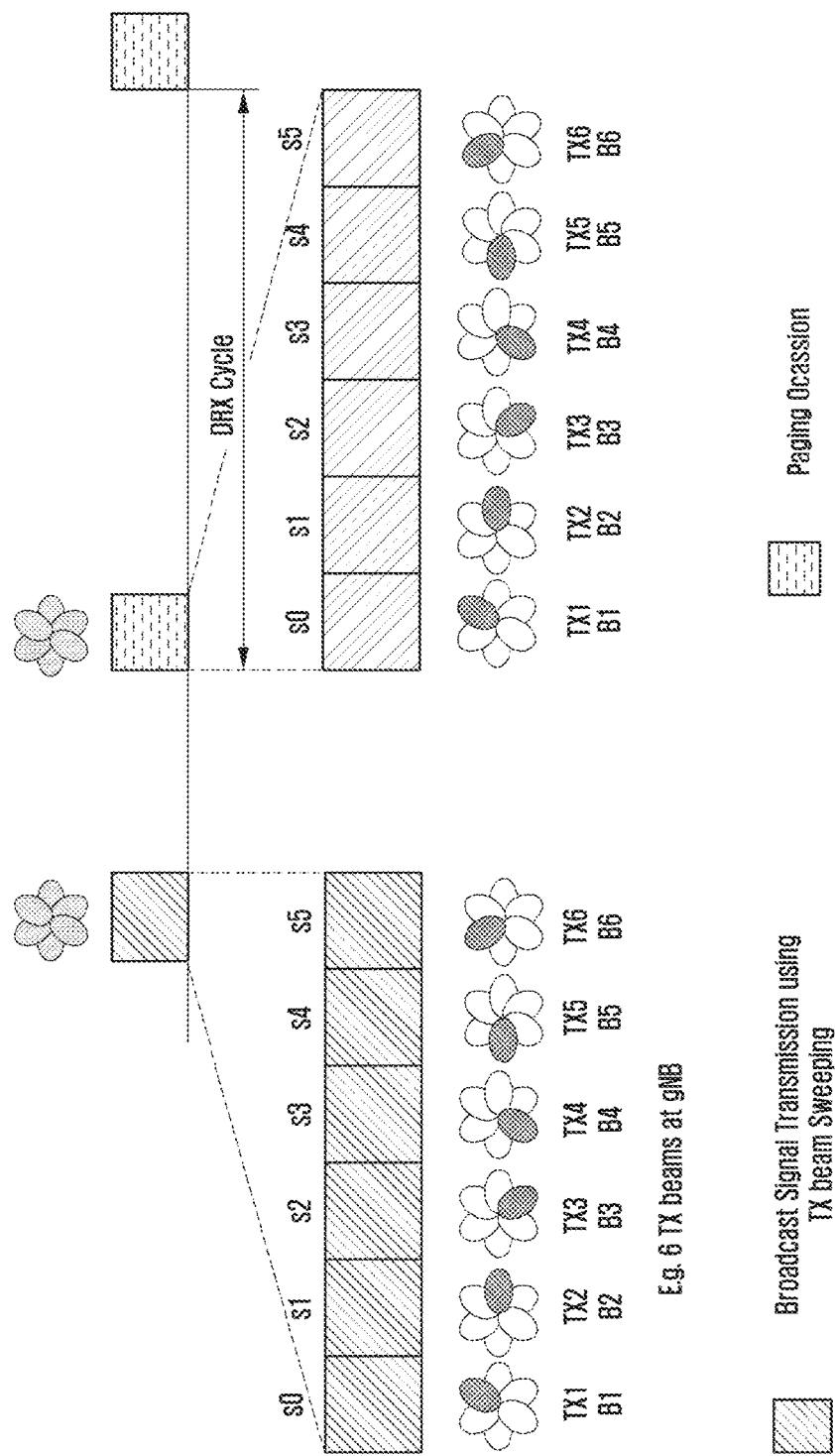
FIG. 8 illustrates embodiment of receiving a paging according to various embodiments of the present disclosure.

FIG. 8 illustrates another embodiment of receiving a paging according to various embodiments of the present disclosure.

The embodiment illustrated in FIG. 8 of the method to minimize UE's power consumption is as follows: a UE power consumption can be reduced if the UE can determine the best/suitable DL TX beam using the broadcast signals such NR-PSS/SSS/PBCH and then monitors the time slot in PO corresponding to the best/suitable DL TX beam. If the signal quality of received signal from a DL TX beam is above a certain threshold then the signal quality of received signal is a suitable DL TX beam. The threshold can be signaled by network in system information. Note that a UE anyways have to monitor the broadcast signals such as NR-PSS/SSS to check if a UE is in same cell or not. So, determining the best/suitable DL TX beam does not lead to any additional complexity at the UE.

In order to determine the time slot corresponding to best/suitable DL TX beam, a UE needs to know the mapping between one or more DL TX beams and time slots in PO. There are two ways of signaling the mapping between one or more DL TX beams and time slots in PO.

First, implicit Signaling can be used. The mapping between one or more DL TX beams and time slots in PO can be implicit. The order in which DL TX beams are used for transmission of NR-PSS/SSS/BCH is same as order in which DL TX beams are used for transmission of paging message in PO like shown in FIG. 8. For example, if best/suitable DL TX beam is TX 5, then a UE monitors only time slot 4 for receiving paging.

Second, explicit Signaling can be used. The mapping between one or more DL TX beams and time slots in PO can be explicit signaled in system information.

In an alternate embodiment, NR-PSS/SSS/BCH may be transmitted using multiple SS blocks. A UE power consumption can be reduced if the UE can determine the best/suitable SS block (i.e. SS block in which the UE has received the broadcast signals such NR-PSS/SSS/PBCH and RSRP (Reference Signal Received Power) of that SS block is best/suitable) and then monitors the time slot in PO corresponding to the best/suitable SS block. Each SS block is identified by SS block ID.

In order to determine the time slot corresponding to best/suitable SS block, a UE needs to know the mapping between one or more SS blocks and time slots in PO. There are also two ways of signaling the mapping between one or more SS blocks and time slots in PO.

First, implicit Signaling can be used. The mapping between one or more SS blocks and time slots in PO can be implicit. For example, SS block ID 1 is mapped to time slot 1 in PO, SS block ID2 is mapped to time slot 2 in PO and so on.

Second, explicit Signaling can be used. The mapping between one or more SS blocks (SS block IDs) and time slots in PO can be explicit signaled in system information.

In an embodiment, network may indicate whether TX beams used for transmission of PSS/SSS/PBCH is QCL with those used for transmission of paging or not. If not, then a UE monitors all time slots in PO. If yes, then the UE can identify the time slot corresponding to best/suitable DL TX beam or SS block and only monitor that. If a UE is able to receive synchronization signals and/or broadcast channel successfully from multiple DL TX beams then TX beam with strongest signal quality is the best DL TX beam. If the signal quality of received signal from a DL TX beam is above a certain threshold then the signal quality of received signal is a suitable DL TX beam. The threshold can be signaled by network in system information. If a UE is able to receive synchronization signals and/or broadcast channel successfully from multiple SS blocks, then SS block in which it received signals with strongest signal quality is the best SS block. If the signal quality of received signal from a SS block is above a certain threshold then the signal quality of received signal is a suitable SS block. The threshold can be signaled by network in system information.

Figure 9A:
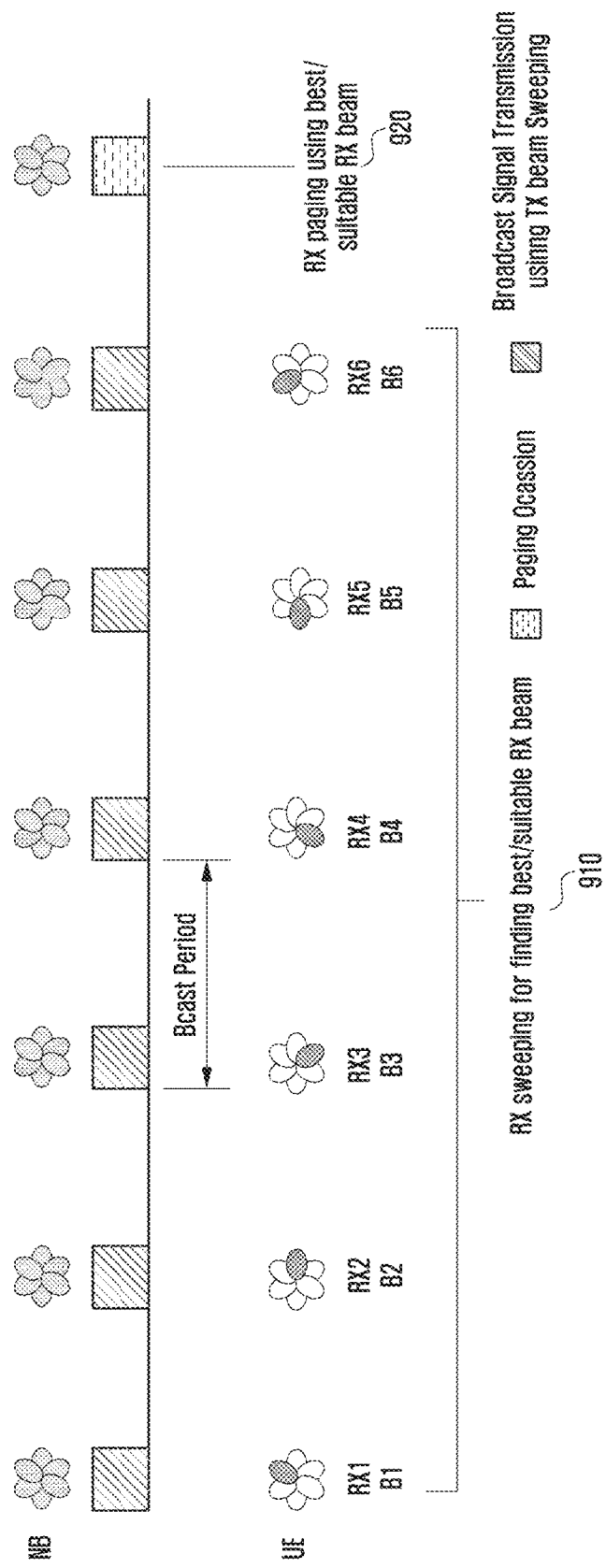
FIGS. 9A and 9B illustrate embodiments of receiving a paging according to various embodiments of the present disclosure.
Figure 9B:
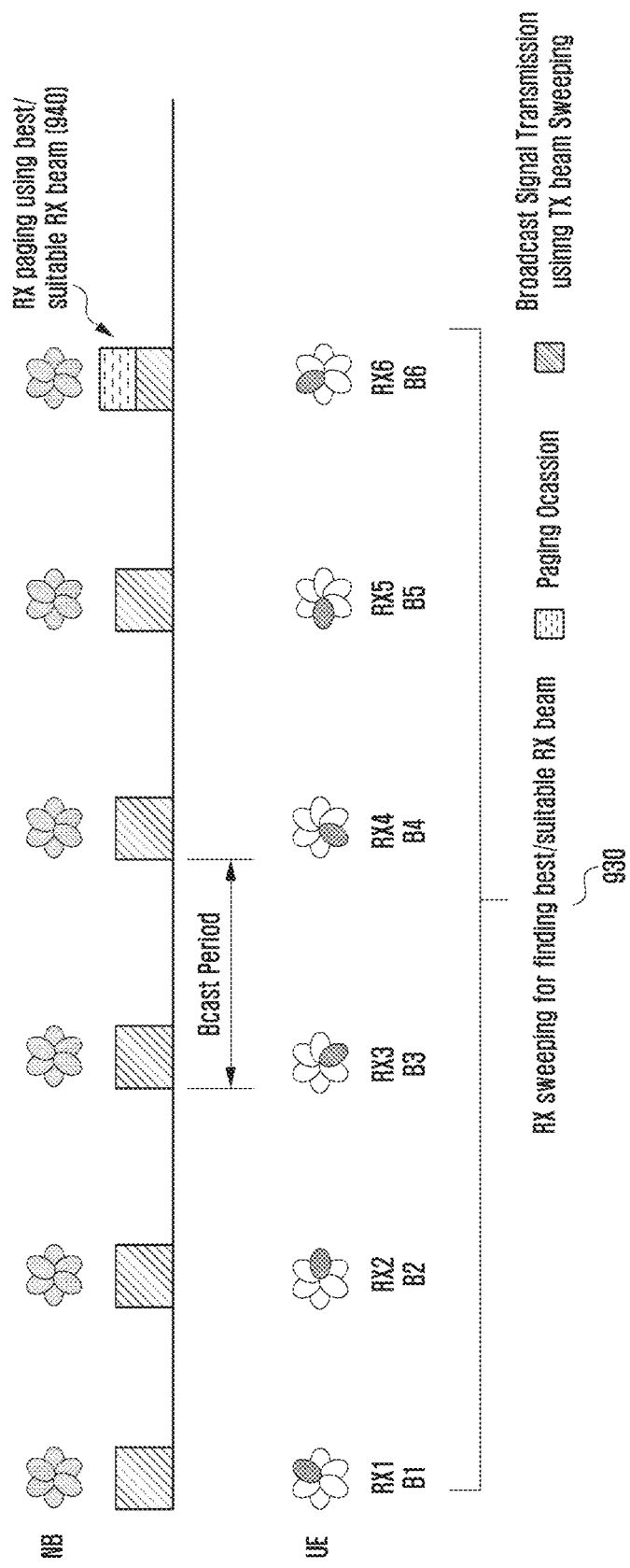

FIGS. 9A and 9B illustrate embodiments of receiving a paging according to various embodiments of the present disclosure.

In a beamformed system, a UE may also perform RX beamforming. If a UE has several RX beams then a UE has to determine the RX beams for receiving paging in PO. If a UE has N RX beams and paging is transmitted using a TX beam only once then a UE wakes up in advance before the PO to monitor the broadcast signals such as NR-PSS/SSS/BCH, perform RX beam sweeping and determine the best/suitable RX beam (910, 930). A UE then uses this RX beam to receive paging in PO (920, 940), like shown in FIG. 9A and FIG. 9B. Note that this is needed irrespective of whether paging is FDMed with PSS/SSS/BCH in same time slot or not. A UE has to wakeup N*P ms before the PO (910) where P is the periodicity at which broadcast signals such as NR-PSS/SSS/BCH are transmitted using full TX beam sweeping as shown in FIG. 9A. Alternately, if paging is FDMed with PSS/SSS/BCH, then the UE has to wakeup (N−1)*P ms before the PO (930) as shown in FIG. 9B.

Figure 10A:
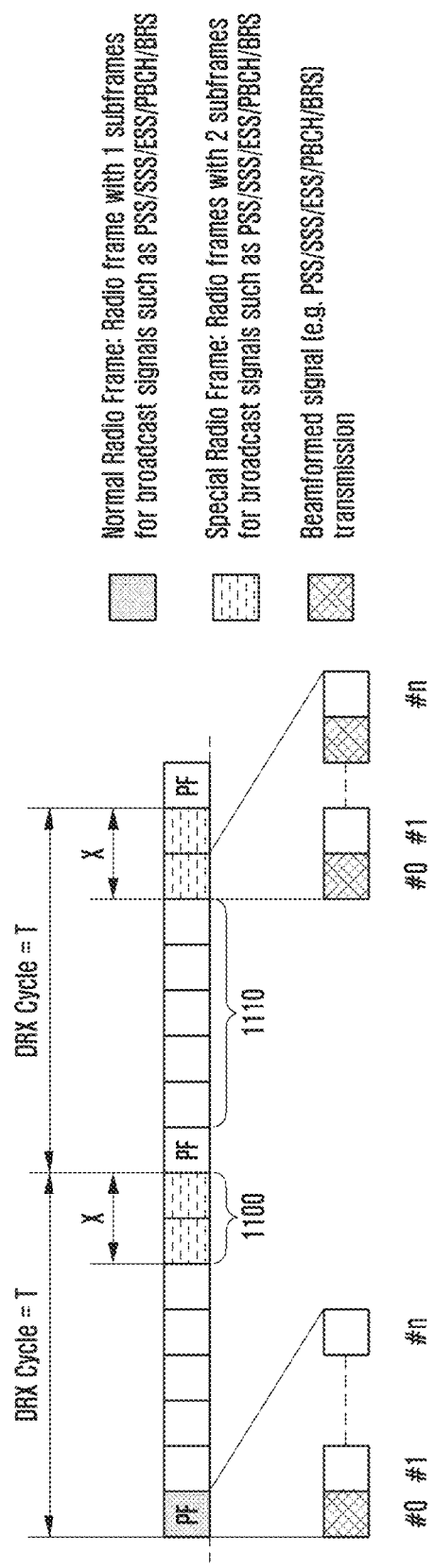
FIGS. 10A and 10B illustrate embodiments of transmitting broadcast signals according to various embodiments of the present disclosure.
Figure 10B:
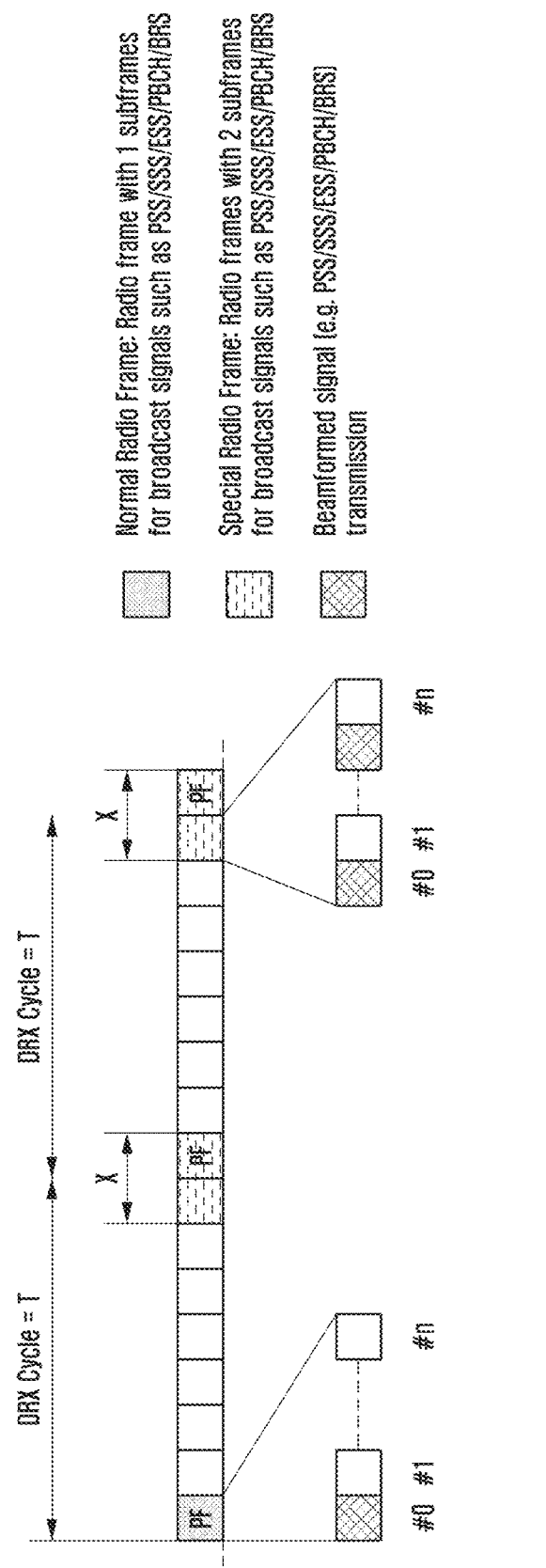

FIGS. 10A and 10B illustrate embodiments of transmitting broadcast signals according to various embodiments of the present disclosure.

In the existing system, broadcast signals (such as PSS/SSS/ESS/PBCH/BRS (Beam Reference Signal)) are transmitted periodically. For example, period can be one radio frame where these signals are transmitted in subframe #0 in every radio frame. In order to reduce the early wake up time, we propose to transmit the broadcast signals (such as PSS/SSS/ESS/PBCH/BRS) more frequently in certain radio frames. In one embodiment, broadcast signals (such as PSS/SSS/ESS/PBCH/BRS) are transmitted more frequently in "X" consecutive radio frames (1100) before the paging frame. These "X" radio frames (1100) are referred as special radio frames and other radio frames (1110) are referred as normal radio frames as shown in FIG. 10A.

In an alternate embodiment, "X" consecutive radio frames may include the paging frame as well, as shown in FIG. 10B. In case of TDD system, these "X" radio frames are "X" consecutive DL radio frames. There can be UL radio frames in between these "X" consecutive DL radio frames. The value of "X" can be signaled by network in broadcast or dedicated signaling. The value of X can also be pre-defined. The subframes in these "X" radio frames where broadcast signals (such as PSS/SSS/ESS/PBCH/BRS) are transmitted can also be signaled by network in broadcast or dedicated signaling. The subframes in these "X" radio frames where broadcast signals (such as PSS/SSS/ESS/PBCH/BRS) are transmitted can be pre-defined or signaled by network in broadcast or dedicated signaling.

The additional subframes in these "X" radio frames where broadcast signals (such as PSS/SSS/ESS/PBCH/BRS) are transmitted may transmit PSS/ESS/SSS using a sequence different than those used in other radio frames. In one embodiment, PBCH transmitted in subframe may include information indicating the subframe # of that subframe. After receiving the PBCH, this information can be used to determine the start of radio frame as each radio frame has fixed number of subframes.

It is to be noted that above method can also be applied for other scenarios such as connected mode DRX (in this case instead of defining X with respect to paging radio frame, X is specified with respect to first radio frame of ON duration) or other periodic ON/OFF scenarios.

In one embodiment, the first subframe of the paging frame which contains these special subframes which contain the extra transmission of broadcast signals (such as PSS/SSS/ESS/PBCH/BRS) is indicated in the PDCCH of the first subframe of the paging frame. Alternatively, each subframe carries the indication of the type of the subframe whether the type of the subframe is special or normal from the perspective of carrying the said one or more broadcast signals such as PSS/SSS/ESS/PBCH/BRS). In another alternative the paging message can indicate the presence of such special subframes in the subsequent paging occasion.

Figure 11:
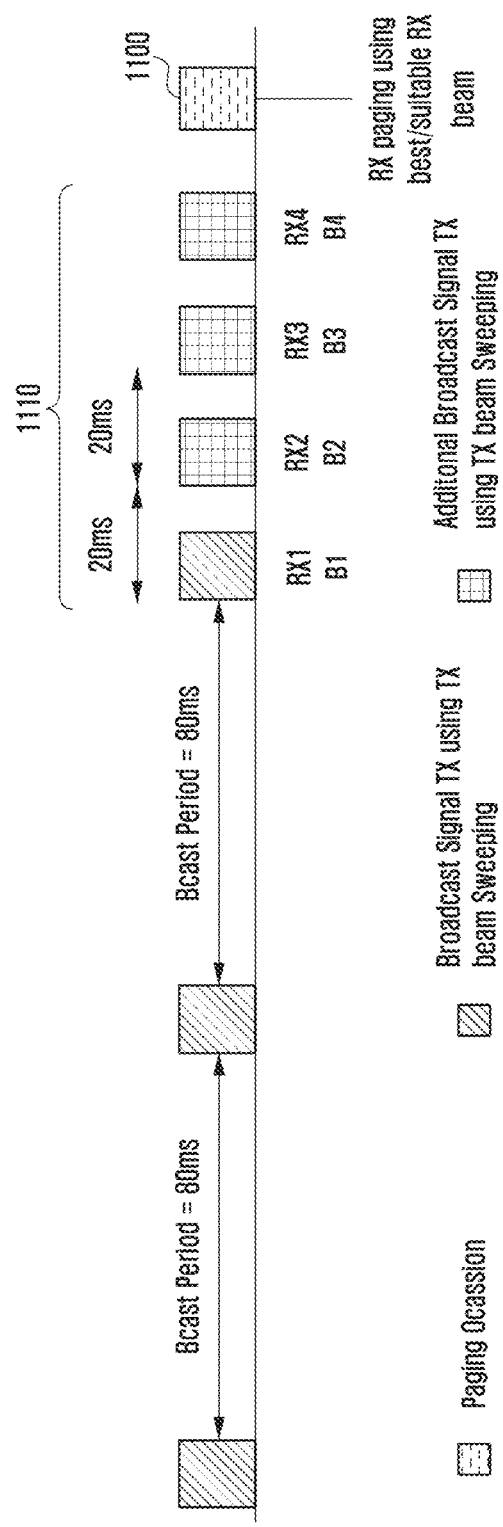
FIG. 11 illustrates another embodiment of transmitting broadcast signals according to various embodiments of the present disclosure.

FIG. 11 illustrates another embodiment of transmitting broadcast signals according to various embodiments of the present disclosure. In one embodiment, the broadcast signals (e.g., PSS/SSS/ESS/PBCH/BRS) are transmitted at shorter periodicity for certain time duration (X, 1110) before the PO (1100). For example, in FIG. 11 normal broadcast period of PSS/SSS/ESS/PBCH is 80 ms. However, before the PO, for example, the period is configured as 20 ms. Network may signal duration X (1110) and periodicity of PSS/SSS/ESS/PBCH during this duration X.

FIGS. 12 to 19 illustrates exemplary embodiments of determining paging occasion according to the present disclosure. Before determining paging occasion, a UE identifies and determines paging frame(s) first. Total 4 methods of determining paging frame and paging occasion will be described detail below.

In some embodiments, DRX cycle comprises of one or more paging frames. One PF comprise of one or more Radio Frames. DRX cycle interval is multiple of paging frame duration. Each PF may contain one or multiple Paging Occasion(s). One PO comprises of one or more paging slots. Paging slot can be a subframe or TTI or a set of OFDM symbols or slot or mini slot. A UE first determines the start of paging frame (PF). PF of the UE starts at the radio frame (each radio frame is numbered and identified by system frame number or SFN) which satisfies the equation 1 below:

$$SFN \bmod T = (T \text{ div } N)*(UE\_ID \bmod N) \quad \text{Equation (1)}$$

where, "T" is the duration of DRX cycle in unit of radio frames, "nB" is the number of paging occasions in duration T, N: min (T/X, nB); N is the number of paging frames having at least one paging occasion; X: Number of radio frames in a PF; In one embodiment X can be 1. X can be signaled in system information. Default value of X can be 1 and used if X is not signaled, UE_ID: (IMSI or S-TMSI or any other ID) mod N1, and N1 is determined based on least significant bits of IMSI or S-TMSI or any other ID are used as UE_ID.

For example, if 10 least significant bits of IMSI or S-TMSI or any other ID are used as UE ID then N1 is $2^{10}$ i.e. 1024, or, UE_ID: ((IMSI or S-TMSI or any other ID)/N2) mod N3; N2 and N3 can be same or different.

For example, if bits 10 to bits 19 are to be used as UE ID then N2 and N3 are set to 1024. In another example If bits 14 to 24 are to be used as UE ID then N2 is 16384 and N3 is 1024. Parameters T, nB are signaled by network in broadcast or dedicated signaling. X can also be signaled in system information.

In alternate embodiment, PF of a UE starts at the radio frame (each radio frame is numbered and identified by system frame number or SFN) which satisfies the equation 2 below:

$$SFN \bmod T = X*(UE\_ID \bmod N) \quad \text{Equation (2)}$$

where, "T" is the duration of DRX cycle in unit of radio frames, N: T/X; N is the number of paging frames having at least one paging occasion, X: Number of radio frames in a PF.

In one embodiment X can be 1. X can be signaled in system information. Default value of X can be 1 and used if X is not signaled. UE_ID: (IMSI or S-TMSI or any other ID) mod N1; N1 is determined based on how many least significant bits of IMSI or S-TMSI or any other ID are used as UE ID. For example, if 10 least significant bits of IMSI or S-TMSI or any other ID are used as UE ID then N1 is $2^{10}$ i.e. 1024.

Or, UE_ID: ((IMSI or S-TMSI or any other ID)/N2) mod N3; N2 and N3 can be same or different. For example, if bits 10 to bits 19 are to be used as UE ID then N2 and N3 are set to 1024. In another example If bits 14 to 24 are to be used as UE ID then N2 is 16384 and N3 is 1024. Parameter T is signaled by network in broadcast or dedicated signaling. X can also be signaled in system information After determining the start of paging frame, paging occasion in paging frame is identified and/or determined. In first embodiment, the paging occasion is determined as following equation 3:

$$PO \text{ number}=i\_s \bmod (\text{number of } POs \text{ in a } PF) \quad \text{Equation (3)}$$

where, i_s=floor(UE_ID/N) mod Ns; Ns: max (1,nB/(T/X)).

In one embodiment Ns can also be fixed or configured by network. X: Number of radio frames in a PF.

In one embodiment X can be 1. X can be signaled in system information. Number of POs in a PF=Number of paging slots in a PF/(number of paging slots in each PO). Number of paging slots in each PO=number of TX beams/number of antenna arrays. It is assumed that t using one antenna array, one beam can be transmitted in one paging slot.

Each PO in paging frame is sequentially numbered starting from zero.

Number of TX beams and number of antenna arrays are signaled by network in broadcast or dedicated signaling or number of paging slots in each PO is signaled.

An eNB may broadcast paging using all TX beams in PO. Alternately the eNB may transmit using subset of TX beams if the eNB is aware (as described later in the present disclosure TX beams associated with UEs to be paged.

A UE reports the number of the antenna arrays that the UE may use for reception of the paging.

An eNB can use all the TX beams or a subset of the TX beams based on the best TX beam(s) reported by the UEs corresponding to the PO.

Alternately Number of POs in a PF=Duration of PF/Duration of PO. Duration of PO can be signaled by network in system information or broadcast or dedicated signaling. Alternately Number of POs in a PF can be signaled by network in system information or broadcast or dedicated signaling.

In second embodiment, the paging occasion is determined as following equation 4:

$$\text{First paging slot of } PO=i\_s*i\_r \quad \text{Equation (4)}$$

where, i_s=floor(UE_ID/N) mod Ns; Ns: max (1,nB/(T/X)); nB/T may be <=Number of POs in a PF.

In one embodiment Ns can also be fixed or configured by network. X: Number of radio frames in a PF. In one embodiment X can be 1. X can be signaled in system information. i_r=Number of paging slots in each PO=number of TX beams/number of antenna arrays (Alternate) i_r=Number of paging slots in each PO=number of TX beams/(number of antenna arrays*Number of paging channel per paging slot).

Each paging slot in paging frame is sequentially numbered starting from zero.

A number of TX beams, number of antenna arrays are signaled by network or number of paging slots in each PO is signaled.

eNBs may broadcast paging using all TX beams in PO. Alternately the eNB may transmit using subset of TX beams if the eNB is aware (as described later in the present disclosure) of TX beams associated with UEs to be paged.

In third embodiment, the paging occasion is determined as following equation 5:

$$PO \text{ Number}=i\_s \quad \text{Equation (5)}$$

where, i_s=floor(UE_ID/N) mod Ns; and Ns: max (1, nB/(T/X)).

In one embodiment Ns can also be fixed or configured by network. X: Number of radio frames in a PF.

In one embodiment X can be 1. X can be signaled in system information. Number of POs in a PF=Number of paging slots in a PF/(number of paging slots in each PO). Number of paging slots in each PO=number of TX beams/number of antenna arrays. Here we assume that using one antenna array, one beam can be transmitted in one paging slot.

Alternately, Number of paging slot in each PO==number of TX beams/(number of antenna arrays*Number of paging channel per paging slot). Each paging slot can have several time division multiplexed paging channels.

Alternately Number of POs in a PF=Duration of PF/Duration of PO. Duration of PO can be signaled by network in system information or broadcast or dedicated signaling. Alternately Number of POs in a PF can be signaled by network in system information or broadcast or dedicated signaling. Each PO in paging frame is sequentially numbered starting from zero.

First paging slot of PO=PO #*Number of paging slots in each PO.

eNBs may broadcast paging using all TX beams in PO. Alternately the eNB may transmit using subset of TX beams if the eNB is aware (as described later in the present disclosure) of TX beams associated with UEs to be paged.

In fourth embodiment, the paging occasion is determined as following equation 6:

$$PO\#=\text{floor}(UE\_ID/N) \bmod (\text{number of } POs \text{ in a } PF) \quad \text{Equation (6)}$$

Number of POs in a PF=Number of paging slots in a PF/(number of paging slots in each PO).

Number of paging slot in each PO=number of TX beams/number of antenna arrays. Here we assume that using one antenna array, one beam can be transmitted in one paging slot.

Alternately, Number of paging slot in each PO==number of TX beams/(number of antenna arrays*Number of paging channel per paging slot). Each paging slot can have several time division multiplexed paging channels.

Alternately, Number of POs in a PF=Duration of PF/Duration of PO. Duration of PO can be signaled by network in system information or broadcast or dedicated signaling. Alternately, Number of POs in a PF can be signaled by network in system information or broadcast or dedicated signaling.

Each PO in paging frame is sequentially numbered starting from zero.

Number of TX beams, number of antenna arrays are signaled by network.

First paging slot of PO=PO #*Number of paging slots in each PO eNBs may broadcast paging using all TX beams in PO. Alternately the eNBs may transmit using subset of TX beams if an eNB is aware (as described later in the present disclosure) of TX beams associated with UEs to be paged.

In fifth embodiment, the paging occasion is determined as following equation 7.

i_s to PO number mapping is pre-defined or, alternately i_s to first paging slot of PO is pre-defined. Size of PO is determined as explained earlier. Equation 7 is given by:

$$i\_s=\text{floor}(UE\_ID/N) \bmod Ns \quad \text{Equation (7)}$$

where, Ns: max (1, nB/(T/X)); In one embodiment Ns can also be fixed or configured by network.

First paging slot of PO=PO #*Number of paging slots in each PO.

Figure 12:
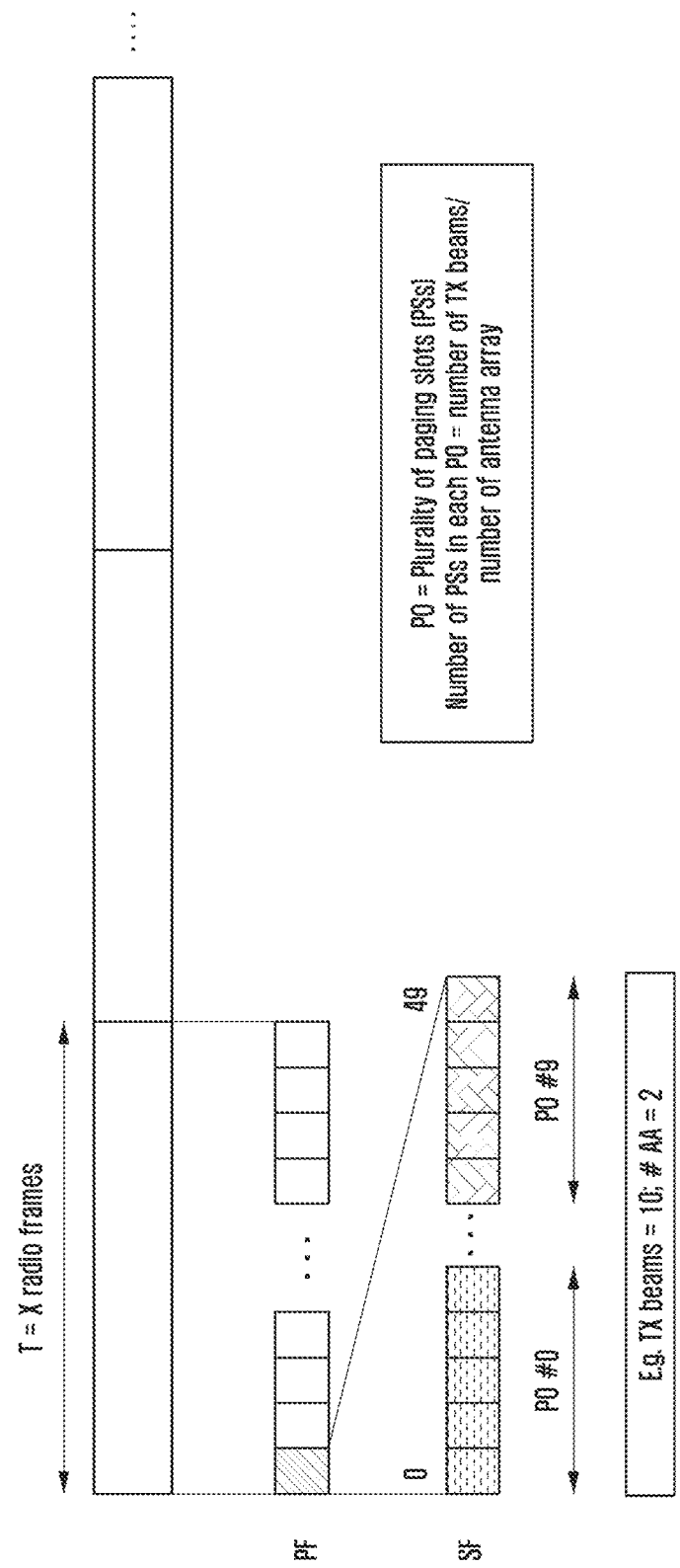
FIG. 12 illustrates an embodiment of determining paging occasion according to various embodiments of the present disclosure.
Figure 13:
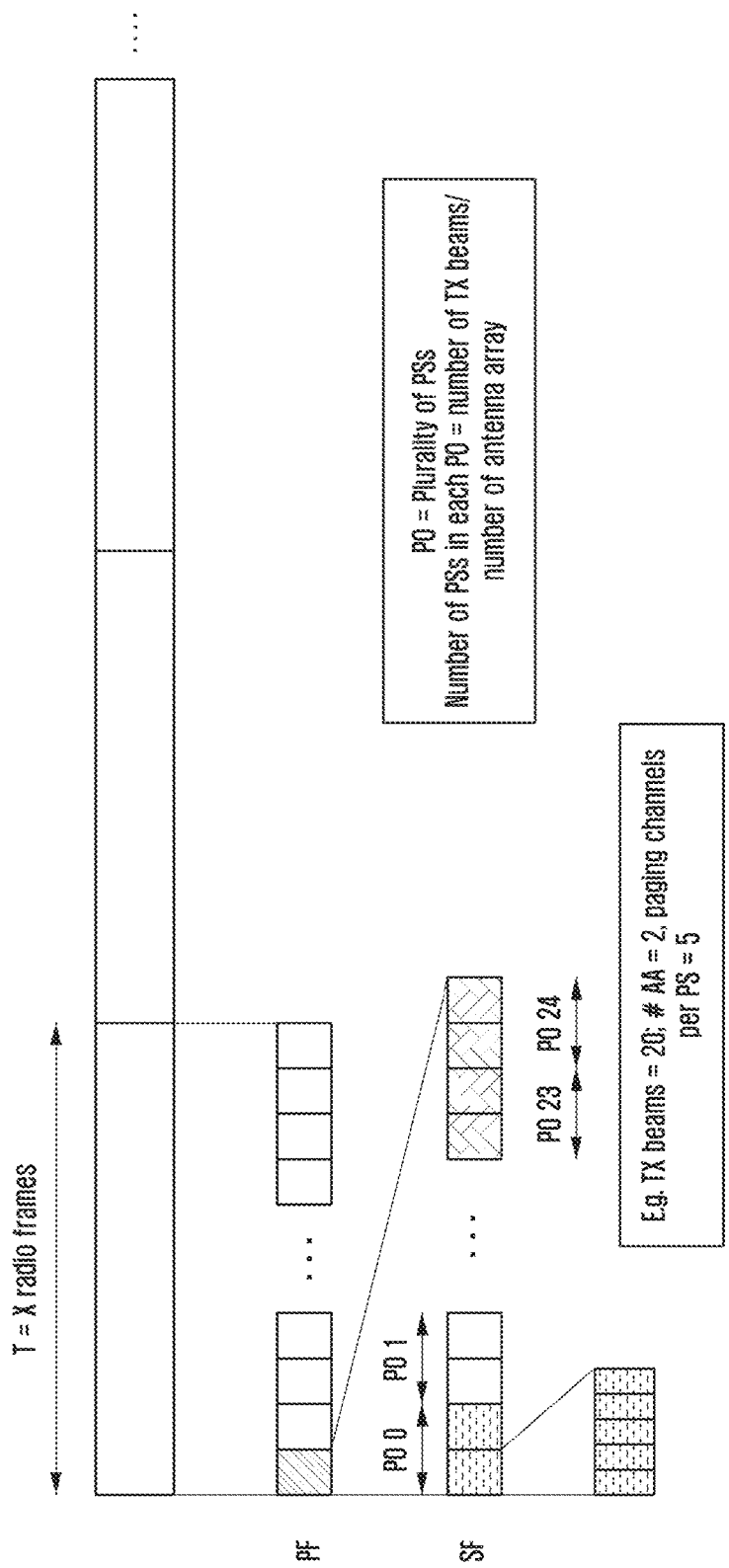
FIG. 13 illustrates another embodiment of determining paging occasion according to various embodiments of the present disclosure.

Examples of PO numbering are shown in FIG. 12 and FIG. 13. In FIG. 13, one paging slot has several paging channels.

In one embodiment, number of TX beams can be replaced by number of TX beams*Number of RX beams in the above embodiments.

In some embodiments, DRX cycle comprises of one or more paging frames. One PF comprise of one or more Radio Frames. DRX cycle interval is multiple of paging frame duration. Each PF contain one Paging Occasion. One PO comprises of one or more paging slots. Paging slot can be a subframe or TTI. A UE first determines the start of paging frame (PF). PF of a UE starts at the radio frame (each radio frame is numbered and identified by system frame number or SFN) which satisfies the equation 1, equation 2 and corresponding definitions above. For better understanding, equation 1 and equation 2 are described again as equation 8 and 9. Equation 8 is given by:

$$SFN \bmod T = (T \text{ div } N)*(UE\_ID \bmod N) \quad \text{Equation (8)}$$

where, "T" is the duration of DRX cycle in unit of radio frame, "nB" is the number of paging occasions in duration T, N: min (T/X, nB); N is number of paging frames having at least one paging occasion, UE_ID: (IMSI or S-TMSI or any other ID) mod N1; N1 is determined based on least significant bits of IMSI or S-TMSI or any other ID are used as UE ID.

For example, if 10 least significant bits of IMSI or S-TMSI or any other ID are used as UE ID then N1 is $2^{10}$ i.e. 1024.

Or, UE_ID: ((IMSI or S-TMSI or any other ID)/N2) mod N3; N2 and N3 can be same or different. For example, if bits 10 to bits 19 are to be used as UE ID then N2 and N3 are set to 1024.

In another example If bits 14 to 24 are to be used as UE_ID then N2 is 16384 and N3 is 1024. Parameters T, nB are signaled by network. X can also be signaled in system information. Equation 9 is given by:

$$SFN \bmod T = X*(UE\_ID \bmod N) \quad \text{Equation (9)}$$

where, "T" is the duration of DRX cycle in unit of radio frames N: T/X; N is the number of paging frames having at least one paging occasion. X: Number of radio frames in a PF; In one embodiment X can be 1. X can be signaled in system information. UE_ID: (IMSI or S-TMSI or any other ID) mod N1; N1 is determined based on least significant bits of IMSI or S-TMSI or any other ID are used as UE ID. For example, if 10 least significant bits of IMSI or S-TMSI or any other ID are used as UE ID then N1 is $2^{10}$ i.e. 1024.

Or, UE_ID: ((IMSI or S-TMSI or any other ID)/N2) mod N3; N2 and N3 can be same or different. For example, if bits 10 to bits 19 are to be used as UE ID then N2 and N3 are set to 1024.

In another example If bits 14 to 24 are to be used as UE ID then N2 is 16384 and N3 is 1024. Parameter T is signaled by network in broadcast or dedicated signaling. X can also be signaled in system information.

In alternate embodiment, PF of a UE starts at the radio frame (each radio frame is numbered and identified by system frame number or SFN) which satisfies the equation 10 below:

$$SFN \bmod T = \text{offset} \quad \text{Equation (10)}$$

where "T" is the duration of DRX cycle in unit of radio frame. Offset can be zero. Offset can also be signaled.

There can be several paging slots in one radio frame. In one embodiment, the paging slot which constitute the paging occasion can be pre-defined. In another embodiment, the paging slot can be signaled in broadcast or dedicated signaling. In one embodiment the paging slot can be indicated dynamically using PBCH (e.g. MIB or SIB). PBCH transmitted prior (during a pre-defined time) to paging frame can indicate the paging slots of paging occasion or the PBCH transmitted prior to paging can indicate starting paging slot of paging occasion. The number of paging slots in paging occasion can be determined as explained in method 1. Subframe/paging slot to TX beam mapping in PO can also be pre-defined or signaling via RRC or BCH.

Figure 14:
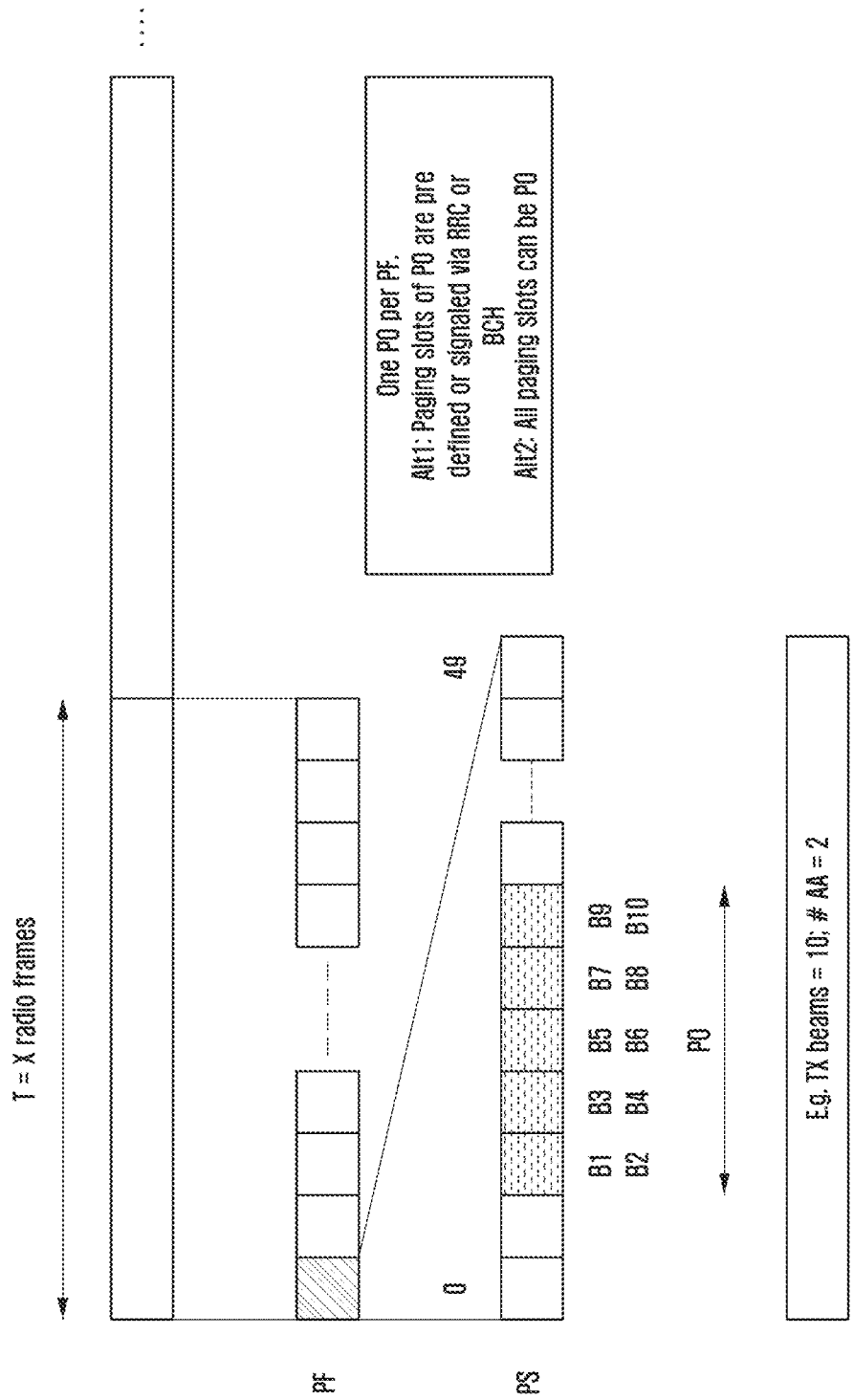
FIG. 14 illustrates yet another embodiment of determining paging occasion according to various embodiments of the present disclosure.
Figure 15:
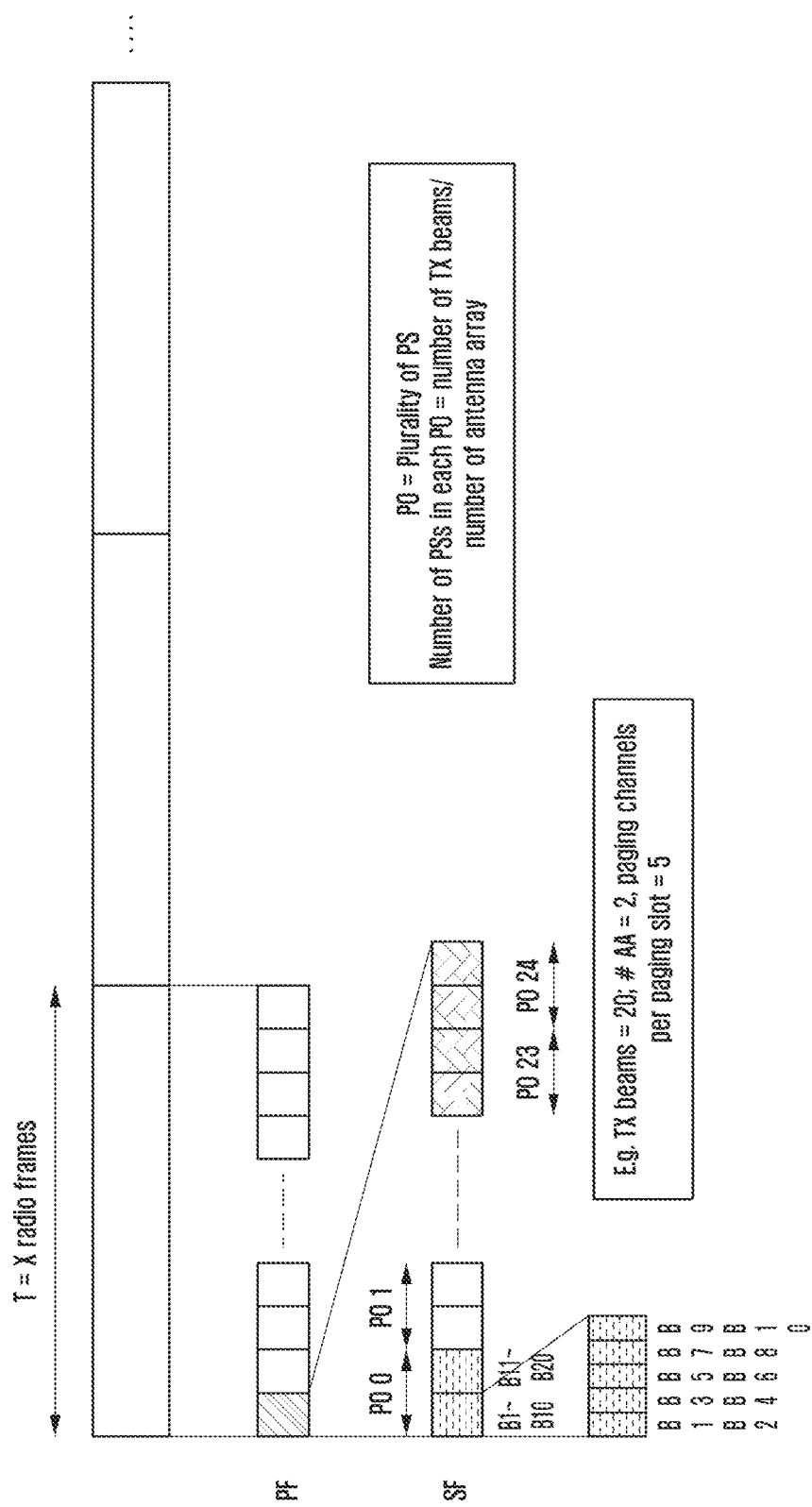
FIG. 15 illustrates yet another embodiment of determining paging occasion according to various embodiments of the present disclosure.

In one embodiment all paging slots in paging frame constitute paging occasion. An example of PO numbering is shown in FIG. 14 and FIG. 15. In FIG. 15, one paging slot has several paging channels.

In one embodiment, whether TTI for paging message transmission using a beam is one paging slot or multiple paging slots can also be signaled. This can be indicated in BCH or other broadcast signaling. This can be signaled prior to paging frame. Depending on paging load, network can use one or more paging slots for paging message.

Figure 16:
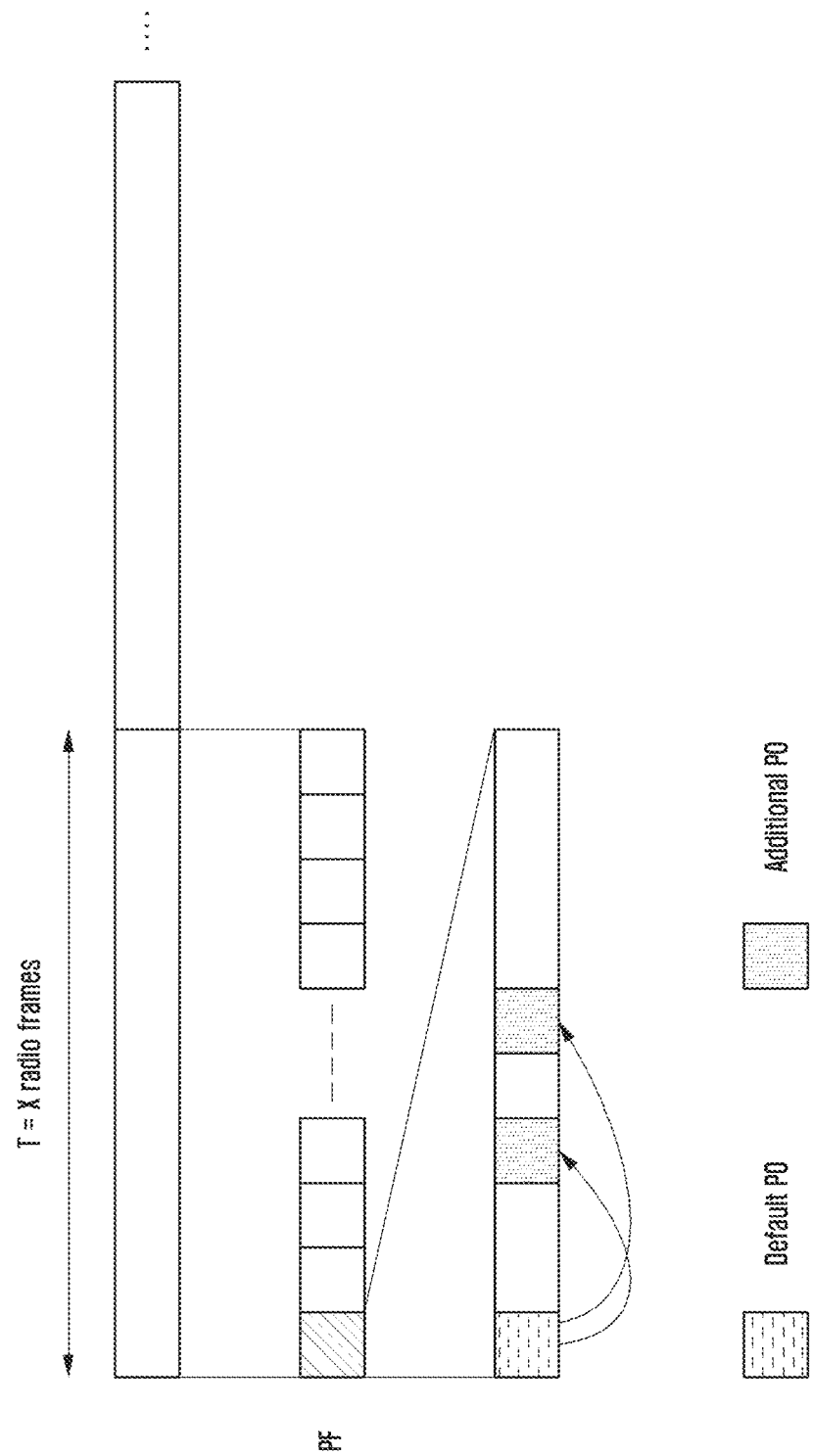
FIG. 16 illustrates another embodiment of determining paging occasion according to various embodiments of the present disclosure.
Figure 17:
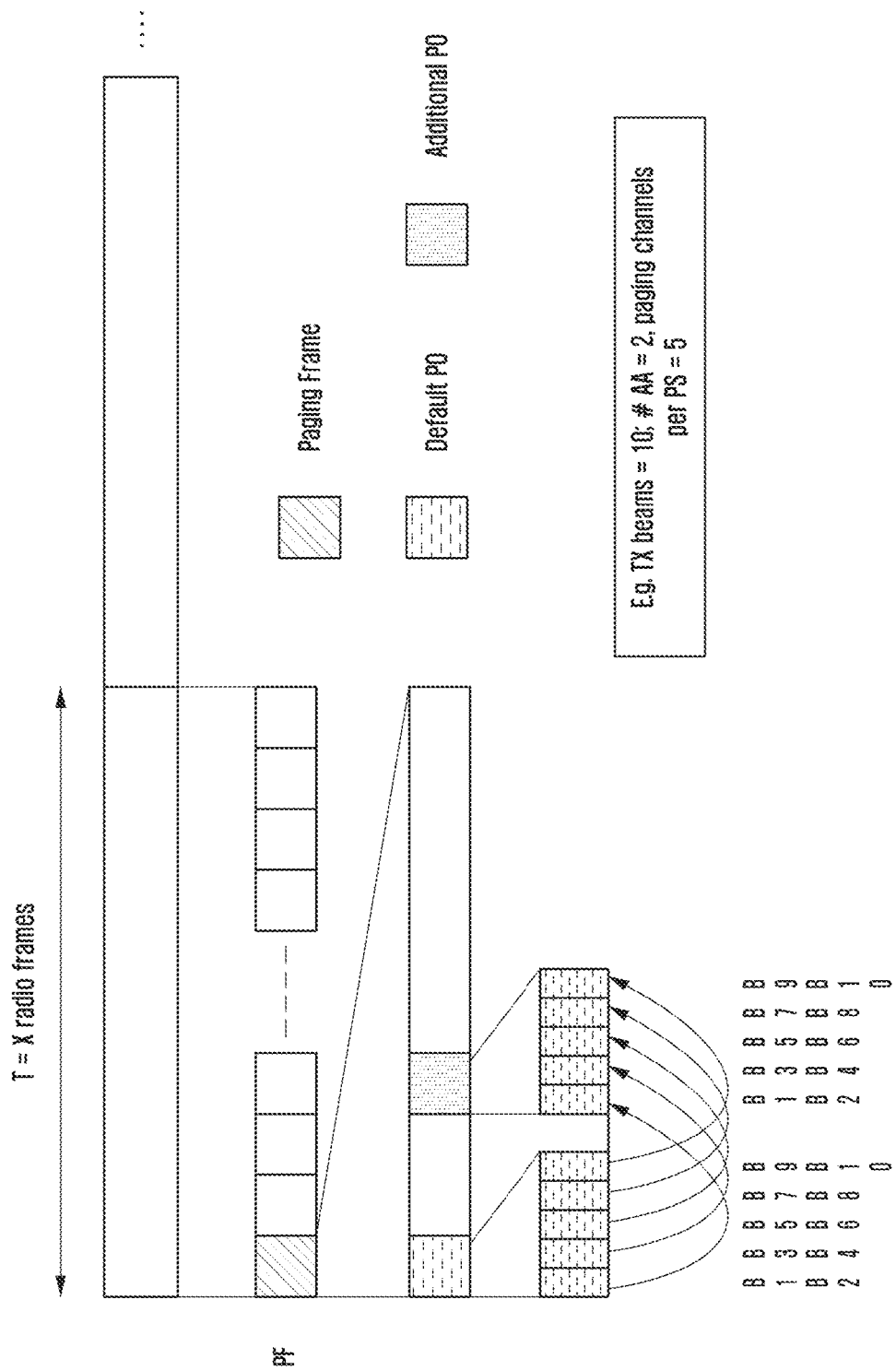
FIG. 17 illustrates another embodiment of determining paging occasion according to various embodiments of the present disclosure.
Figure 18:
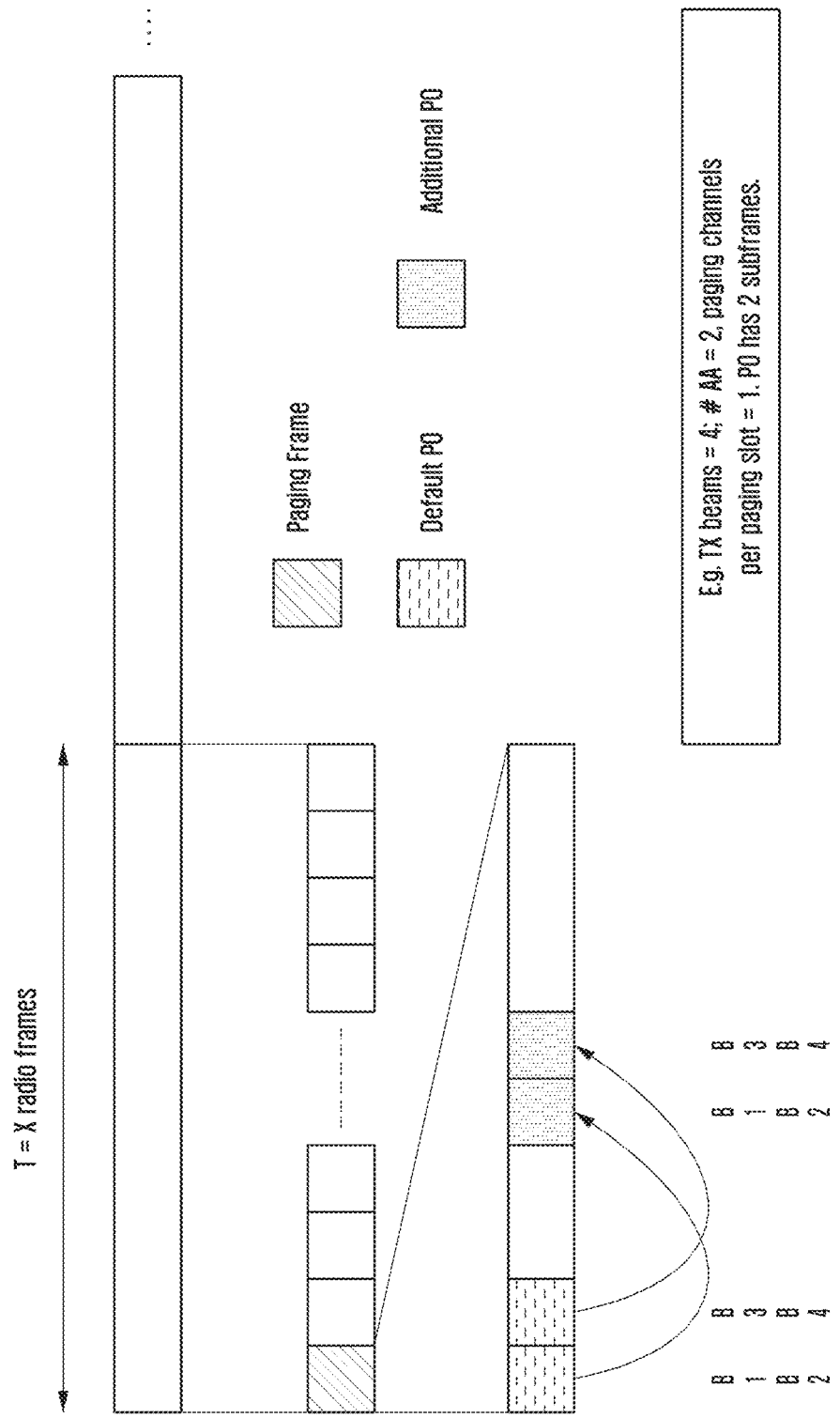
FIG. 18 illustrates yet another embodiment of determining paging occasion according to various embodiments of the present disclosure.

In some embodiments, DRX cycle comprises of one or more paging frames. One PF comprise of one or more radio frames. DRX cycle interval is multiple of paging frame duration. Each PF may contain one or multiple paging occasion(s). One paging occasion is by default. Other additional paging occasions are indicated if needed as shown in FIG. 16 to FIG. 18. One PO comprises of one or more paging slots. Paging slot can be a subframe or TTI. A UE first determines the start of paging frame (PF). PF of the UE starts at the radio frame (each radio frame is numbered and identified by system frame number or SFN) which satisfies at least one of the above-described equations 8, 9 and 10 and corresponding definitions.

In alternate embodiment, paging frame can be pre-defined and fixed in system.

In one embodiment, the paging slot(s) which constitutes the default paging occasion can be pre-defined. It can be the paging slot in which PSS/SSS/ESS/PBCH is transmitted. In another embodiment, the paging slot can be signaled in broadcast or dedicated signaling. In one embodiment the paging slot can be indicated dynamically using PBCH (e.g. MIB or SIB). PBCH transmitted prior (during a pre-defined time) to paging frame can indicate the paging slots of default paging occasion or the PBCH transmitted prior to paging frame can indicate starting paging slot of default paging occasion. The number of paging slots in paging occasion can be determined as explained in method 1. Paging slots/paging channels to TX beam mapping in PO can also be pre-defined or signaling via RRC or BCH.

Information (e.g. location) about additional POs can be indicated in a message (e.g. paging message) transmitted in default PO if needed. In one embodiment x LSBs of UE ID can be there in message in transmitted in default PO to indicate which UEs may monitor which additional PO. Alternately each UE monitors all additional PO (a UE stops monitoring remaining POs if paging is received for the UE in PO). Alternately a UE monitors a PO if UE ID mod N=PO number, where N is number of additional POs or number of additional PO+default PO. Additional POs can be at pre-defined offset with respect to default PO and only indication of additional number of POs is needed in a message (e.g. paging message) transmitted in default PO. Alternately explicit location of additional POs can be indicated in a message (e.g. paging message) transmitted in default PO. Alternately a message (e.g. paging message) transmitted in one PO can indicate the presence and location of subsequent PO. Additional POs can be indicated in BCH also. In one embodiment number of default PO can be more than one. One of the default or last PO can indicate additional POs.

In some embodiments, a UE determines the paging frame as follows:

A UE monitors paging in 'S' consecutive radio frames starting the radio frame which satisfies the equation 11:

$$SFN \bmod T = (T \operatorname{div} N)*(UE\_ID \bmod N); N = \min(T/S, nB) \quad \text{Equation (11)}$$

where, "T" is the duration of DRX cycle in unit of radio frame. "nB" is the number of paging occasions in duration T. N: min(T, nB); UE_ID: (IMSI or S-TMSI or any other ID) mod N1; N1 is determined based on how may least significant bits of IMSI or S-TMSI or any other ID are used as UE ID. For example, if 10 least significant bits of IMSI or S-TMSI or any other ID are used as UE ID then N1 is $2^{10}$ i.e. 1024.

Or, UE_ID: ((IMSI or S-TMSI or any other ID)/N2) mod N3; N2 and N3 can be same or different. For example, if bits 10 to bits 19 are to be used as UE ID then N2 and N3 are set to 1024.

In another example, if bits 14 to 24 are to be used as UE ID then N2 is 16384 and N3 is 1024.

S=number of radio frames needed for transmitting paging using all Tx beams. S can be one if all TX beams can be transmitted in one radio frame.

Alternately, S=number of radio frames needed for transmitting paging using all Tx beams and receiving using all RX beams.

Figure 19:
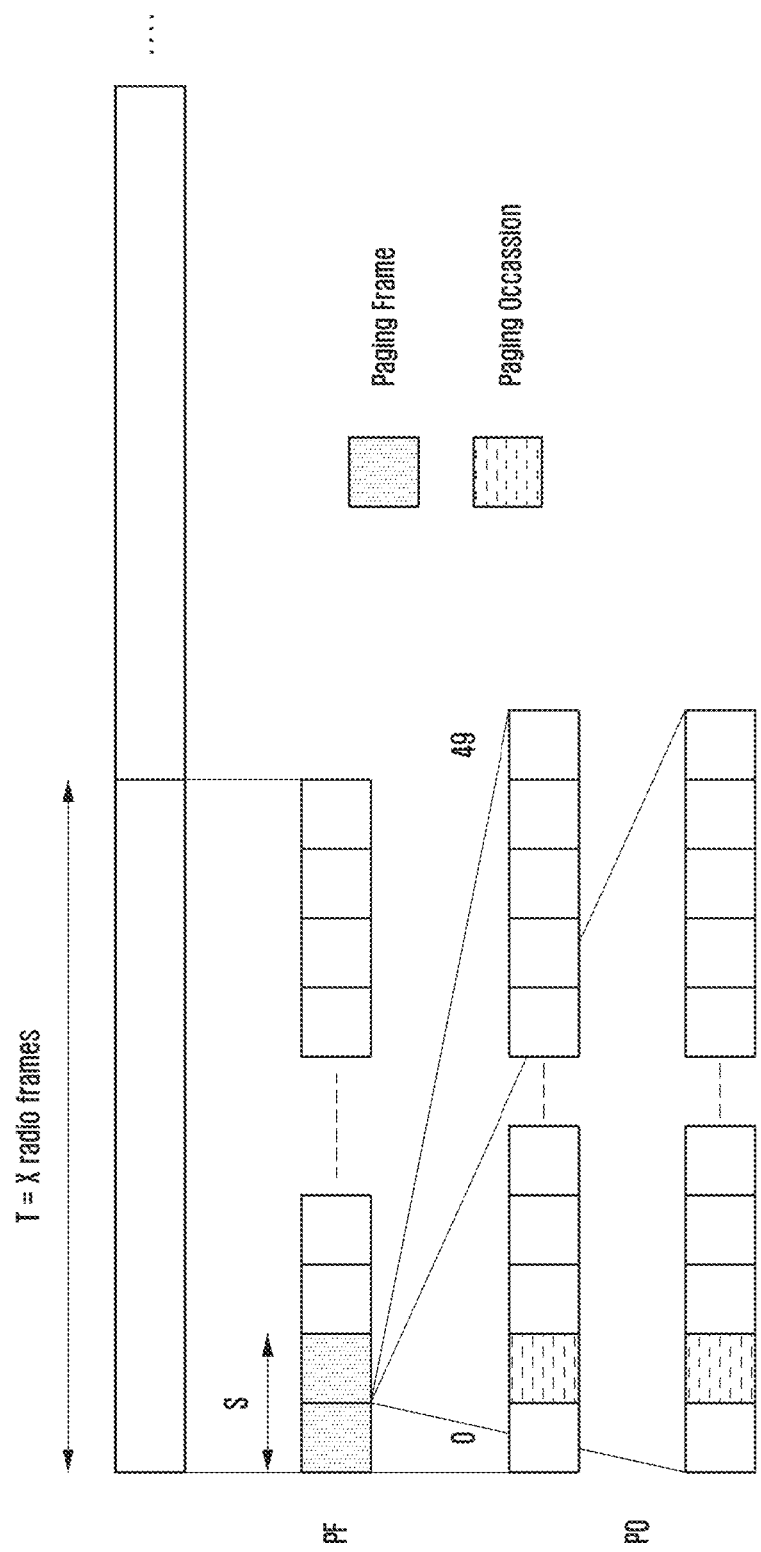
FIG. 19 illustrates yet another embodiment of determining paging occasion according to various embodiments of the present disclosure.
Figure 20:
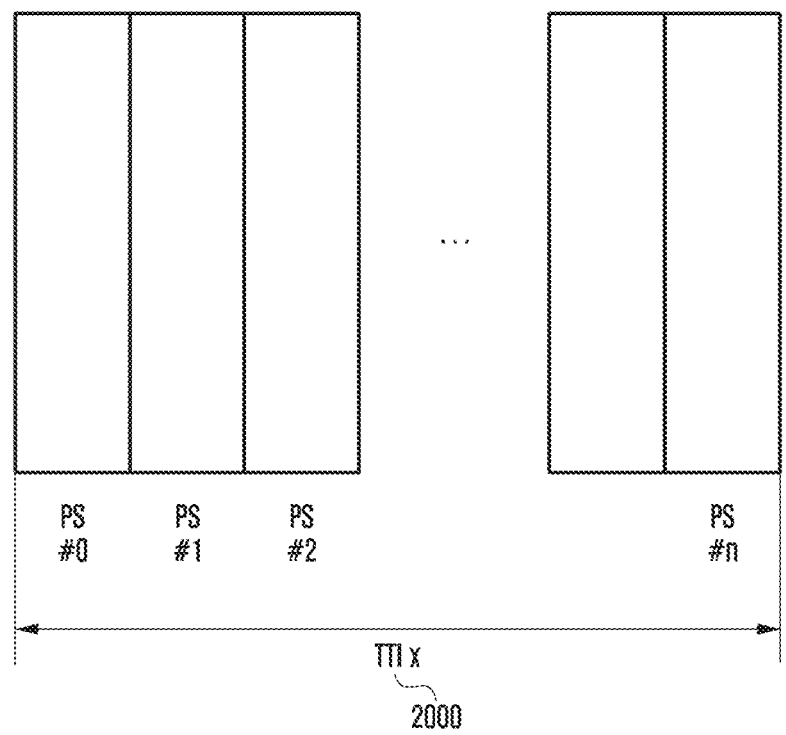
FIG. 20 illustrates an embodiment of transmitting paging indication according to various embodiments of the present disclosure.

A UE determines the PO in paging frame as follows: In each radio frame, paging slot(s) where paging is transmitted is fixed as shown in FIG. 19. In one embodiment these can be time slot(s) where PSS/SSS/ESS/PBCH/BRS is transmitted. In another embodiment, these can be time slots(s) at an offset from time slot where PSS/SSS/ESS/PBCH/BRS is transmitted. In another embodiment, these can be determined as in the aforementioned embodiments, FIG. 20 illustrates an embodiment of transmitting paging indication according to various embodiments of the present disclosure. Before the paging frame a paging indication can be transmitted. The paging indication is transmitted if paging is there in paging frame. The paging indication can be broadcasted using beamforming in TTI (2000) as shown in FIG. 20. A TTI (2000) has plurality of paging indication slots. Each paging indication slot (PS) has one or more OFDM symbols. The number of OFDM symbols in each PS can be pre-defined or signaled by network in RRC signaling or in BCH. Other signals (such as PSS/SSS/ESS/BCH/BRS, etc.) can be transmitted (FDM/CDM) together with paging indication in PS. Paging indication can be transmitted in specific PRBs or all PRBs in each PS. If paging indication is transmitted in specific PRBs then these PRBs can be pre-defined or signaled by network in RRC signaling or in BCH. Paging indication message is transmitted using one or more beams in each PS. Mapping between PS and beam(s) can be pre-defined or signaled. In each PS one or more paging indication channels can be transmitted. Each paging indication channel can be of fixed size (e.g. transmitted over fixed number of PRBs). This can reduce decoding complexity. Alternately paging indication channel can be of variable size.

At least one of the following information might be included in paging indication.

A) Fixed size bit map. Each bit corresponds to one or more UEs. If size of bit map is N, UE_ID mod N gives the bit in bitmap corresponding to a UE.

B) Variable size bit map. BCH may indicate the size of bitmap. BCH in subframe X may indicate paging indication info in same subframe or for subframe at a fixed offset. Each bit corresponds to one or more UEs. If size of bit map is N, UE ID mod N gives the bit in bitmap corresponding to a UE.

Figure 21:
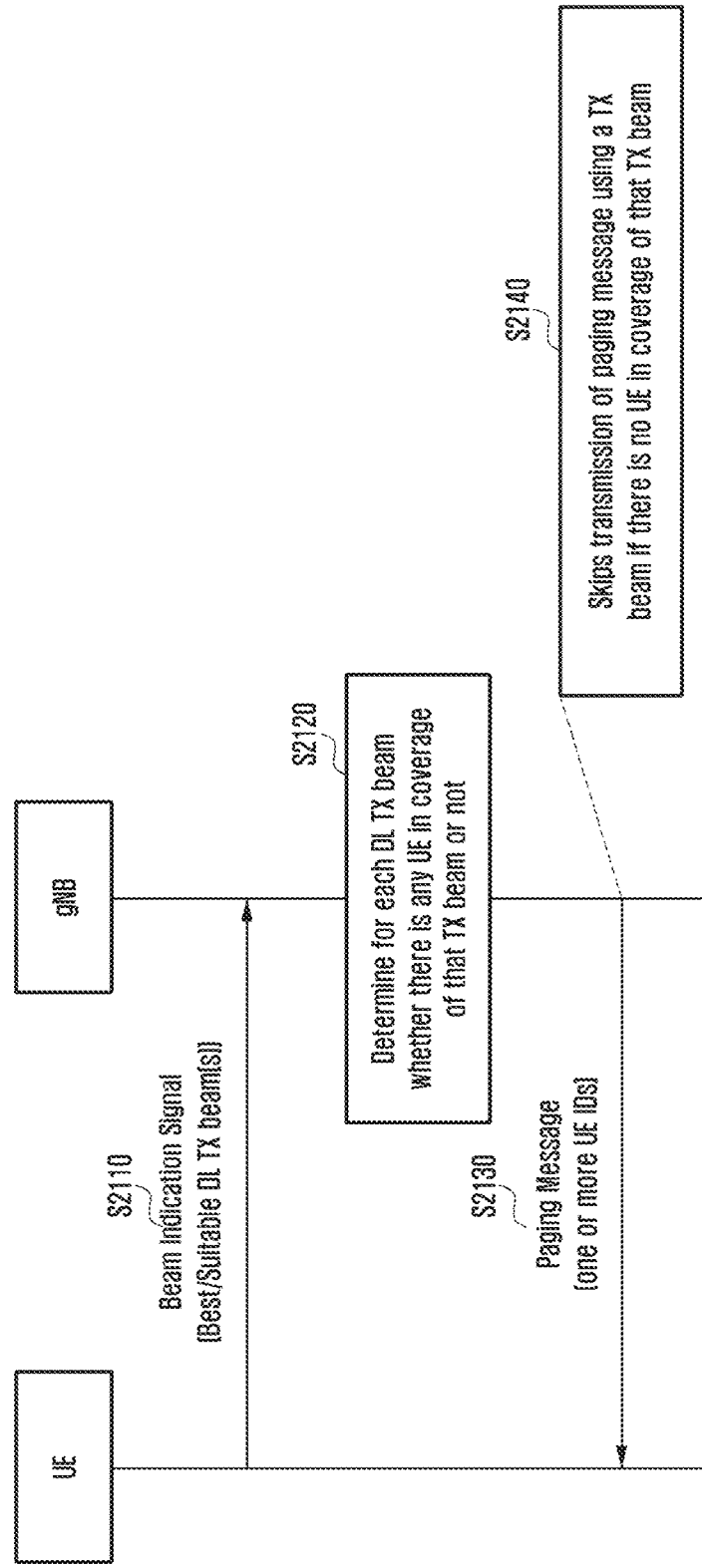
FIG. 21 illustrates an embodiment of transmitting paging according to various embodiments of the present disclosure.
Figure 22:
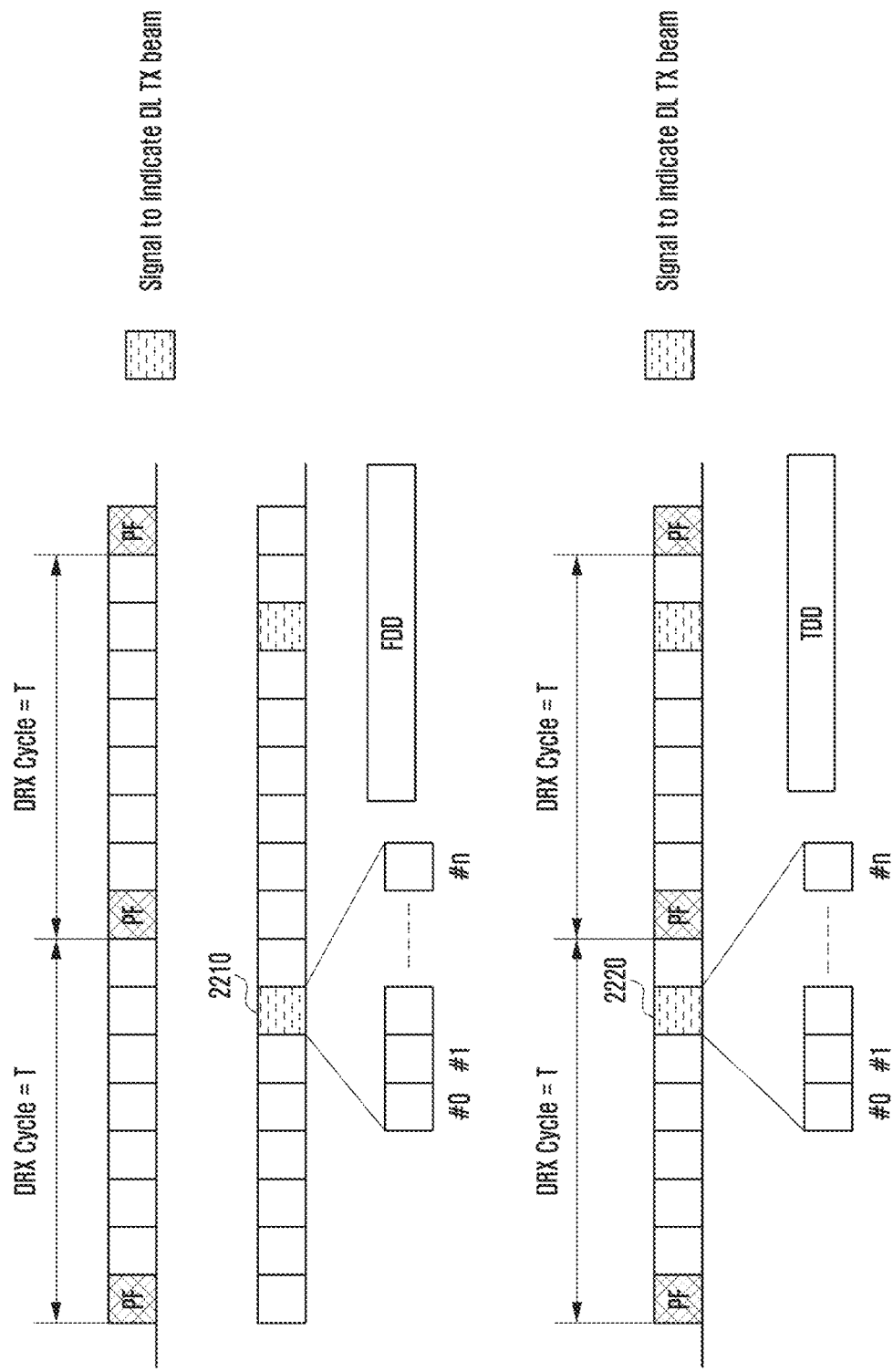
FIG. 22 illustrates another embodiment of transmitting paging according to various embodiments of the present disclosure.

FIGS. 21 & 22 illustrates an embodiment of transmitting paging according to various embodiments of the present disclosure. And FIG. 21 illustrates the signaling flow between a UE and gNB in one embodiment.

Step 1: a UE in idle/inactive state transmits beam information (referred as beam indication signal or message) every paging DRX cycle (S2110). The beam information indicates the suitable or best DL TX beam(s) or SS block ID(s) of best/suitable SS blocks determined by the UE. The best/suitable SS block (i.e. SS block in which the UE has received the broadcast signals such NR-PSS/SSS/PBCH and RSRP of that SS block is best/suitable. The DL TX beam is the TX beam of BS/gNB/TRP. The RSRP of SS block is suitable if the RSRP of SS block is above a threshold where the threshold is pre-defined or signaled by network. If a UE has received broadcast signals from multiple SS blocks, then best SS block is the one with highest RSRP value. A UE may transmit multiple beam indication signals or messages to indicate multiple DL TX beams or SS block IDs. In an embodiment, one signal or message may indicate multiple DL TX beams or SS block IDs. In an embodiment, the beam indication signal or message may indicate best/suitable DL TX beam(s) or SS block ID(s) of best/suitable SS blocks, without any information with respect to a UE ID. That is, UE ID may not be included in the beam indication signal or message to reduce overhead of transmitting the beam indication signal or message. It is to be noted that this operation is performed by every UE in idle/inactive state. In an embodiment, network may indicate whether a UE needs to transmit beam information (referred as beam indication signal or message) in system information. If a UE is camped to a cell, then based on this indication in system information a UE decides whether the UE needs to transmit beam information (referred as beam indication signal or message). For example, cell in which paging is transmitted using beamforming may include this indication while other cells in which paging is not transmitted using beamforming may not include this indication.

Step 2: BS/gNB/TRP receives beam indication signal or message from UE(s) (S2110). BS/gNB/TRP receives these before each PO. On receiving these signals/messages from UEs, BS/gNB/TRP can determine whether there is any UE in coverage of the BS/gNB/TRP's DL TX beam or not (S2120). If signal/message indicating DL TX beam is received, the BS/gNB/TRP determines that at least one UE is in coverage of that DL TX beam. If no signal/message indicating DL TX beam is received, the BS/gNB/TRP determines that there is no UE in coverage of that DL TX beam. If signal/message indicating SS block ID is received, the BS/gNB/TRP determines that at least one UE is in coverage of DL TX beam(s) associated with that SS block ID. If no signal/message indicating SS block ID is received, the BS/gNB/TRP determines that there is no UE in coverage of DL TX beam(s) associated with that SS block ID.

Step 3: Accordingly, when BS/gNB/TRP transmits paging in PO (S2130), the BS/gNB/TRP skips transmission of paging message using a TX beam if there is no UE in coverage of that TX beam i.e. TX beam which has not been reported by any UE (S2140) in the beam indication signal. For example, let's say there are 16 TX beam at BS wherein each beam provides coverage in different directions. If the BS has received signal/message(s) from one or more UE(s)

indicating TX beam 1, 5, 8 and 9, then BS transmits paging using only TX beams 1, 5, 8 and 9 amongst the 16 TX beams. In one embodiment, if a UE reports TX beam 1 then TX beam 1 and the UE's neighboring beams can be used by BS to transmit the paging message. The paging message includes UE ID (e.g. S-TMSI or IMSI, etc.) of one or more UEs which are paged. If the UE's UE ID is included, a UE considers that network has paged the UE and initiates procedure to respond to paging.

FIG. 22 illustrates the transmission of beam indication signal with respect to PO according to various embodiments of the present disclosure. A UE transmits the said beam indication signal/message (2210, 2220) before the PO every DRX cycle. The beam indication signal/message can be transmitted at fixed offset from PO. The offset can be pre-defined or broadcasted in dedicated signaling The resources for transmitting the said beam indication signal/message are signaled to a UE in broadcast or dedicated signaling.

In one embodiment, the resources may comprise of multiple time slots and each slot is mapped to one or more TX beams (i.e. DL TX beams) or SS block IDs. A UE transmits a sequence in the time slot corresponding to suitable or best DL TX beam or SS block. A UE transmits using UL TX beam in having same coverage as the RX beam used to receive the suitable or best DL TX beam or SS block. The sequence transmitted is fixed in this case. The sequence to be transmitted can be configured by the network in broadcast or dedicated signaling. In an alternate embodiment, multiple slots can be mapped to a TX beam (i.e. DL TX beam) or SS block to allow the UE to transmit using the UE's multiple TX beams. It is to be noted that the resources configured for transmitting beam indication signal can be common for all UEs.

In another embodiment, the resource may comprise of one time slot and sequence to be transmitted is different for different TX beam (i.e. DL TX beam) or SS block. A UE select the sequence corresponding to suitable or DL TX beam or SS block. Mapping between TX beam (i.e. DL TX beam) or SS block and sequence can be fixed or configured by network in broadcast or dedicated signaling. A UE transmits using UL TX beam in having same coverage as the RX beam used to receive the suitable or best DL TX beam or SS block. In an alternate embodiment, the resource may comprise of multiple time slots and sequence to be transmitted is different for different TX beam (i.e. DL TX beam) or SS block. Multiple slots allow the UE to transmit using the UE's multiple TX beams.

In another embodiment, the resources may comprise of multiple time slots and each slot is mapped to multiple TX beams. Sequence corresponding to multiple TX beams mapped to same time slot is different. A UE select the sequence and time slot corresponding to suitable or DL TX beam or SS block and transmit the sequence in the time slot.

In one embodiment the signal/message can be physical random access channel (PRACH) preamble. PRACH resources (time and/or frequency) and/or PRACH preambles corresponding to one or more DL TX beam(s) or SS blocks can be signaled by network in broadcast or dedicated signaling. In order to indicate a suitable or best DL TX beam or SS block UE transmits MSG 1 or PRACH preamble using selected PRACH resource and/or PRACH preamble corresponding to suitable or best DL TX beam or SS block. It is to be noted that PRACH resource and/or preambles for beam indication signal/message can be reserved. In an embodiment, a gNB may transmit RAR (Random Access Response) in response to PRACH preamble transmission and in case RAR is not received, a UE may retransmit the PRACH preamble. The power is ramped up during retransmission. In another embodiment, there is no RAR and a UE may transmit beam indication signal using power configured by network.

In an alternate embodiment, to transmit beam indication signal/message, random access procedure is initiated by a UE. PRACH resources (time and/or frequency) and/or PRACH preambles corresponding to one or more DL TX beam(s) or SS blocks can be signaled by network in broadcast or dedicated signaling. In order to indicate a suitable or best DL TX beam or SS block UE transmits MSG 1 or PRACH preamble using selected PRACH resource and/or PRACH preamble corresponding to suitable or best DL TX beam or SS block. Random access procedure (initiated for indicating beam for paging purpose) is completed after the UE receives the random access response.

In an alternate embodiment, to transmit beam indication signal/message, random access procedure is initiated by a UE. A UE transmits the beam indication signal/message using MSG3 in UL grant received in RAR. MSG3 includes the suitable or best DL TX beam ID or SS block ID.

Figure 23:
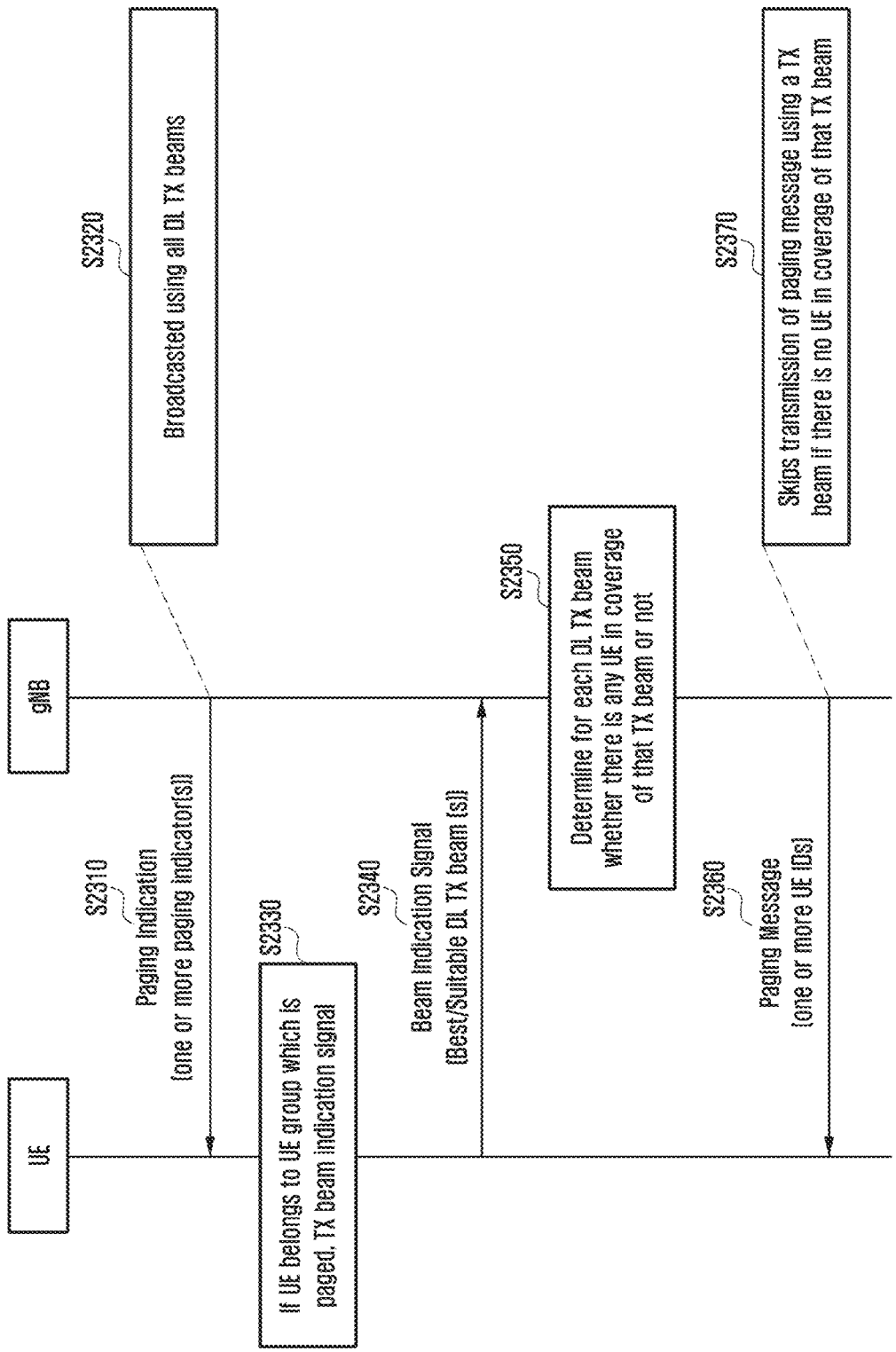
FIG. 23 illustrates yet another embodiment of transmitting paging according to various embodiments of the present disclosure.

FIG. 23 illustrates another embodiment of transmitting paging according to various embodiments of the present disclosure. And FIG. 23 illustrates the signaling flow between a UE and gNB in another embodiment.

Step 1: a gNB broadcast paging indication using all DL TX beams (S2320). The paging indication may be included in paging message (S2310). In an embodiment, paging indication may include one or more UE group IDs. If there is paging for a UE with UE ID "X" then the UE group ID equals to "X" mod N is included in paging indication. "N" can be predefined or signaled. In another embodiment, paging indication may include one or more "N" LSBs of UE IDs. If there is paging for a UE with UE ID "X" then "N" LSBs of UE ID "X" is included in paging indication. In another embodiment, paging indication may include a bitmap of length N bits. If there is paging for a UE with UE ID "X," then ith bit (MSB or LSB) in bitmap is set to one where "i" equals to UE ID mod N. In another embodiment, paging indication may include a bitmap of length N bits. If there is paging for a UE with UE ID "X," then ith bit (MSB or LSB) in bitmap is set to one where "i" equals to (UE ID/N2) mod N, where "N2" is number of Paging frames or paging occasions in DRX cycle over which UEs are distributed. In another embodiment, paging indication may include a bitmap of length N bits. If there is paging for a UE with UE ID "X," then ith bit (MSB or LSB) in bitmap is set to one, where "i" is assigned to UE ID "X" by network.

Step 2: a UE transmits beam information (referred as beam indication signal or message) only if the UE has received paging indication, example paging indication in paging channel or BCH or SIB or another message (e.g. paging message) indicating that paging is there for UE(s) (S2330, S2340). The beam information indicates the suitable or best DL TX beam(s) or SS block ID(s) of best/suitable SS blocks. The best/suitable SS block (i.e. SS block in which the UE has received the broadcast signals such NR-PSS/SSS/PBCH and RSRP of that SS block is best/suitable. The RSRP of SS block is suitable if the RSRP of SS block is above a threshold where the threshold is pre-defined or signaled by network. If a UE has received broadcast signals from multiple SS blocks, then best SS block is the one with RSRP value). A UE may transmit multiple beam indication signals or messages to indicate multiple DL TX beams or SS block IDs. In an embodiment, one signal or message may indicate multiple DL TX beams or SS block IDs.

In another embodiment, a UE transmits the beam indication signal/message only if the UE has received paging indication including the UE's UE group ID (S2330, S2340) where the UE group ID is equal to the UE ID mod N. N can be pre-defined or signaled by network. In another embodiment, a UE transmits the beam indication signal/message only if the UE has received paging indication including the UE's UE group ID (S2330, S2340) where the UE group ID is equal to "N" LSBs (least significant bits) of the UE's UE ID. N can be pre-defined or signaled by network. In another embodiment, a UE transmits the beam indication signal/message only if the UE has received paging indication with ith bit (MSB or LSB) of paging indicator bitmap set to one where "'i" equals to UE ID mod N. Length of paging indicator bitmap is N bits. In another embodiment, a UE transmits the beam indication signal/message only if the UE has received paging indication with ith bit (MSB or LSB) of paging indicator bitmap set to one where "i" equals to (UE ID/N2) mod N, where "N2" is number of Paging frames or paging occasions in DRX cycle over which UEs are distributed. Length of paging indicator bitmap is N bits.

In another embodiment, a UE transmits the beam indication signal/message only if the UE has received paging indication with ith bit (MSB or LSB) of paging indicator bitmap set to one where "i" is assigned to a UE by network. Length of paging indicator bitmap is N bits. Step 3: a gNB receives beam indication signals/messages from UEs (S2340). On receiving these signals from UEs, BS/gNB/TRP can determine whether there is any UE in coverage of the BS/gNB/TRP's DL TX beam or not (S2350). If signal/message indicating DL TX beam is received, the BS/gNB/TRP determines that at least one UE is in coverage of that DL TX beam. If no signal/message indicating DL TX beam is received, the BS/gNB/TRP determines that there is no UE in coverage of that DL TX beam. If signal/message indicating SS block ID is received, the BS/gNB/TRP determines that at least one UE is in coverage of DL TX beam associated with that SS block ID. If no signal/message indicating SS block ID is received, the BS/gNB/TRP determines that there is no UE in coverage of DL TX beam(s) associated with that SS block ID.

Step 4: Accordingly, when BS/gNB/TRP transmits paging in PO (S2360), the BS/gNB/TRP skips transmission of paging message using a TX beam if there is no UE in coverage of that TX beam i.e. TX beam which has not been reported by any UE (S2370). For example, let's say there are 16 TX beam at BS wherein each beam provides coverage in different directions. If the BS has received signal(s) from one or more UE(s) indicating TX beam 1, 5, 8 and 9, then BS transmits paging using only TX beams 1, 5, 8 and 9 amongst the 16 TX beams. In one embodiment, if a UE reports TX beam 1 then TX beam 1 and the UE's neighboring beams can be used by BS to transmit the paging message. The paging message includes UE ID (e.g. S-TMSI or IMSI, etc.) of one or more UEs which are paged. If a UE's UE ID is included, the UE considers that network has paged the UE and initiates procedure to respond to paging.

In this embodiment, paging indication can be received in PO. A UE then transmits the said beam indication signal/message after the PO. After transmitting the beam indication signal, paging message can be received by a UE in the UE's next PO. Alternately, after transmitting the beam indication signal/message, paging message can be received by the UE within a time window. Alternately, after transmitting the beam indication signal/message e.g. in MSG 3, paging message can be received by the UE in MSG 4. Alternately, paging indication can be received before the PO. The location of paging indication can be at an offset with respect to PO. After transmitting the beam indication signal UE receives paging in PO.

The resources for transmitting the said beam indication signal/message are signaled to a UE in broadcast or dedicated signaling.

In one embodiment, the resources may comprise of multiple time slots and each slot is mapped to one or more TX beams (i.e. DL TX beam) or SS block IDs. A UE transmits a sequence in the time slot corresponding to suitable or best DL TX beam or SS block. A UE transmits using UL TX beam in having same coverage as the RX beam used to receive the suitable or best DL TX beam or SS block. The sequence transmitted is fixed in this case. The sequence to be transmitted can be configured by the network in broadcast or dedicated signaling. In an alternate embodiment, multiple slots can be mapped to a TX beam (i.e. DL TX beam) or SS block to allow the UE to transmit using the UE's multiple TX beams. It is to be noted that the resources configured for transmitting beam indication signal can be common for all UEs.

In another embodiment, the resource may comprise of one time slot and sequence to be transmitted is different for different TX beam (i.e. DL TX beam) or SS block. A UE select the sequence corresponding to suitable or DL TX beam or SS block. Mapping between TX beam (i.e. DL TX beam) or SS block and sequence can be fixed or configured by network in broadcast or dedicated signaling. A UE transmits using UL TX beam in having same coverage as the RX beam used to receive the suitable or best DL TX beam or SS block. In an alternate embodiment, the resource may comprise of multiple time slots and sequence to be transmitted is different for different TX beam (i.e. DL TX beam) or SS block. Multiple slots allow the UE to transmit using the UE's multiple TX beams.

In another embodiment, the resources may comprise of multiple time slots and each slot is mapped to multiple TX beams. Sequence corresponding to multiple TX beams mapped to same time slot is different. A UE select the sequence and time slot corresponding to suitable or DL TX beam or SS block and transmit the sequence in the time slot.

In one embodiment the beam indication signal can be PRACH preamble. PRACH resources (time and/or frequency) and/or PRACH preambles corresponding to one or more DL TX beam(s) or SS blocks can be signaled by network in broadcast or dedicated signaling. In order to indicate a suitable or best DL TX beam or SS block UE transmits MSG 1 or PRACH preamble using selected PRACH resource and/or PRACH preamble corresponding to suitable or best DL TX beam or SS block. It is to be noted that PRACH resource and/or preambles for beam indication signal/message can be reserved so that on receiving the PRACH preamble BS can identify that received PRACH preamble is for paging purpose. The PRACH resource and/or preambles can be reserved separately for each UE group (or paging indicator/index) or UE groups (or paging indicator/indexes). In an embodiment, a gNB may transmit RAR in response to received PRACH preamble and incase RAR is not received UE may retransmit the PRACH preamble. The power is ramped up during retransmission. In another embodiment, there is no RAR and UE may transmit signal using power configured by network.

In an embodiment in which RAR is transmitted on receiving PRACH preamble and BS identifies that received PRACH preamble is for paging purpose, paging information i.e. one or more UE IDs which are paged can be included in RAR; alternately paging information i.e. one or more UE IDs which are paged is not included in RAR and paging message including paging information i.e. one or more UE IDs which are paged is transmitted separately after the RAR. If PRACH preamble indicates UE group (or paging indicator/index) or UE groups (or paging indicator/indexes), then on receiving PRACH preamble only one or more UE ID which are paged corresponding to that group is included in RAR or paging message. In case paging information is included in RAR, UL grant may also be included in RAR. If UE's UE ID is received in RAR (or in other words paging information in RAR includes UE's UE ID), a UE transmit MSG 3 including connection request or connection resume request in received UL grant. If multiple UE IDs are included in RAR, UL grant is included for each UE ID. If the UE's UE ID is received in RAR, the UE transmit MSG 3 including connection request or connection resume request in UL grant corresponding to the UE's UE ID. In case of non-beamformed system, after receiving the paging indicator, there is no beam indication signal, but the UE transmits the PRACH preamble. PRACH preamble does not indicate beam information. The remaining procedure is same as explained above.

In an alternate embodiment, to transmit beam indication signal, random access procedure is initiated by a UE. PRACH resources (time and/or frequency) and/or PRACH preambles corresponding to one or more DL TX beam(s) or SS blocks can be signaled by network in broadcast or dedicated signaling. In order to indicate a suitable or best DL TX beam or SS block UE transmits MSG 1 or PRACH preamble using selected PRACH resource and/or PRACH preamble corresponding to suitable or best DL TX beam or SS block. Random access procedure is completed after the UE receives the random access response. Random access procedure (initiated for indicating beam for paging purpose) is completed after the UE receives the random access response. The paging information i.e. one or more UE IDs which are paged can be included in RAR; alternately paging information i.e. one or more UE IDs which are paged is not included in RAR and paging message including paging information i.e. one or more UE IDs which are paged is transmitted separately after the RAR. In case of non-beamformed system, after receiving the paging indicator, there is no beam indication signal, but the UE transmits the PRACH preamble. PRACH preamble does not indicate beam information. The remaining procedure is same as explained above.

After sending the beam indication signal (i.e. PRACH preamble), a gNB may send an acknowledgment indicating beam indication signal is received. In case beam indication signal is indicated using MSG1 i.e. PRACH preamble transmission, a gNB sends an RAR indicating reception of PRACH preamble indicating beam indication signal. In an embodiment RAR is successfully received if the RAR corresponds to both PRACH resource and RAPID used by a UE for PRACH preamble transmission i.e. RAR is successfully received if the UE receives a PDCCH addressed to the UE's RA-RNTI and decoded transport block (MAC PDU) includes RAR carrying RAPID. PDCCH for RAR is addressed to RA-RNTI wherein RA-RNTI is specific to PRACH resource and RAPID is included in RAR MAC PDU. This is the case when both PRACH resource and PRACH preamble together identifies a particular beam indication signal. In another embodiment RAR is successfully received if the RAR corresponds to RAPID of PRACH preamble transmitted by the UE i.e. RAR is successfully received if a UE receives a PDCCH addressed to the UE's RA-RNTI or a reserved RA-RNTI or P-RNTI and decoded transport block (MAC PDU) includes RAR carrying RAPID. This is the case when PRACH preamble identifies a particular beam indication signal. In another embodiment RAR is successfully received if the RAR corresponds to PRACH resource used by the UE for PRACH preamble transmission i.e. RAR is successfully received if the UE receives a PDCCH addressed to the UE's RA-RNTI. This is the case when PRACH resource identifies a particular beam indication signal. In another embodiment of the present disclosure RA-RNTI for receiving RAR for PRACH preamble transmission indicating beam indication signal can be a common or reserved RNTI or P-RNTI (predefined or indicated in minimum system information). A UE monitors for PDCCH addressed to this RA-RNTI in RAR window. If a UE receives RAR scheduled using PDCCH addressed to reserve RA-RNTI, the UE can stop monitoring RAR in RAR window and consider RAR reception as successful. Alternately, if a UE receives RAR scheduled using PDCCH addressed to reserve RA-RNTI and RAR includes RAPID of RACH preamble transmitted by the UE, the UE can stop monitoring RAR in RAR window and consider RAR reception as successful. In case of non-beamformed system, after receiving the paging indicator, there is no beam indication signal, but the UE transmits the PRACH preamble. PRACH preamble does not indicate beam information. The remaining procedure is same as explained above.

In an alternate embodiment, to transmit beam indication signal, random access procedure is initiated by a UE. PRACH resources (time and/or frequency) and/or PRACH preambles corresponding to one or more DL TX beam(s) or SS blocks can be signaled by network in broadcast or dedicated signaling. In order to indicate a suitable or best DL TX beam or SS block UE transmits MSG 1 or PRACH preamble using selected PRACH resource and/or PRACH preamble corresponding to suitable or best DL TX beam or SS block. A UE then monitor RAR window for receiving the random access response. In the UL grant received in RAR, the UE transmits MSG 3. The MSG3 includes UE ID and paging response indication i.e. a UE is transmitting this as UE has received the paging indicator. The connection request or resume request may also be included. On receiving MSG 3 with paging response indication, BS/gNB/TRP checks if there is page for the UE; if yes, BS/gNB/TRP transmits MSG 4 indicating that there is page for the UE; If no, BS/gNB/TRP transmits MSG 4 indicating that there is no page for the UE. In an alternate embodiment, on receiving MSG 3 with a cause value indicating paging indicator response, BS/gNB/TRP checks if there is page for the UE; if yes, BS/gNB/TRP transmits MSG 4 including RRC connection setup or connection resume message; If no, BS/gNB/TRP transmits MSG 4 including RRC connection reject or resume reject. In case of non-beamformed system, after receiving the paging indicator, there is no beam indication signal, but the UE transmits the PRACH preamble. PRACH preamble does not indicate beam information. The remaining procedure is same as explained above.

In an embodiment, paging message may include the paging indication as described in embodiment 2 or may include the full UE ID of UEs which are paged. If the paging indication is included in paging message then UE perform the operation as described in embodiment 2. If paging indication is not included and full UE ID of paged UE is included then UE responds to page if the UE's UE ID is included in paging message. Paging message may include an indication indicating whether the paging message includes paging indication of full UE ID(s).

In addition to procedure described in embodiment 1 and embodiment 2, in this embodiment, beam indication signal not only indicates the suitable or best DL TX beam or SS block but also UE group ID. In an embodiment, a UE group ID is equal to UE ID mod N. N can be predefined or signaling by network. In another embodiment, UE group ID is equal to "N" LSBs (least significant bits) of UE ID.

On receiving this signal, BS/eNB/TRP can determine whether there is any UE in coverage of the BS/eNB/TRP's TX beam or not and if a UE is in coverage what is the UE group ID of that UE. Accordingly, when BS/eNB/TRP transmits paging BS/eNB/TRP skips transmission of paging message using a TX beam if there is no UE in coverage of that TX beam having the same UE group ID as the UE group ID of one of the UEs to be paged. The pair {UE_Idx, DL TX beam ID/SS block ID} is mapped to unique physical resource set (time resource, frequency resource, code).

Figure 24:
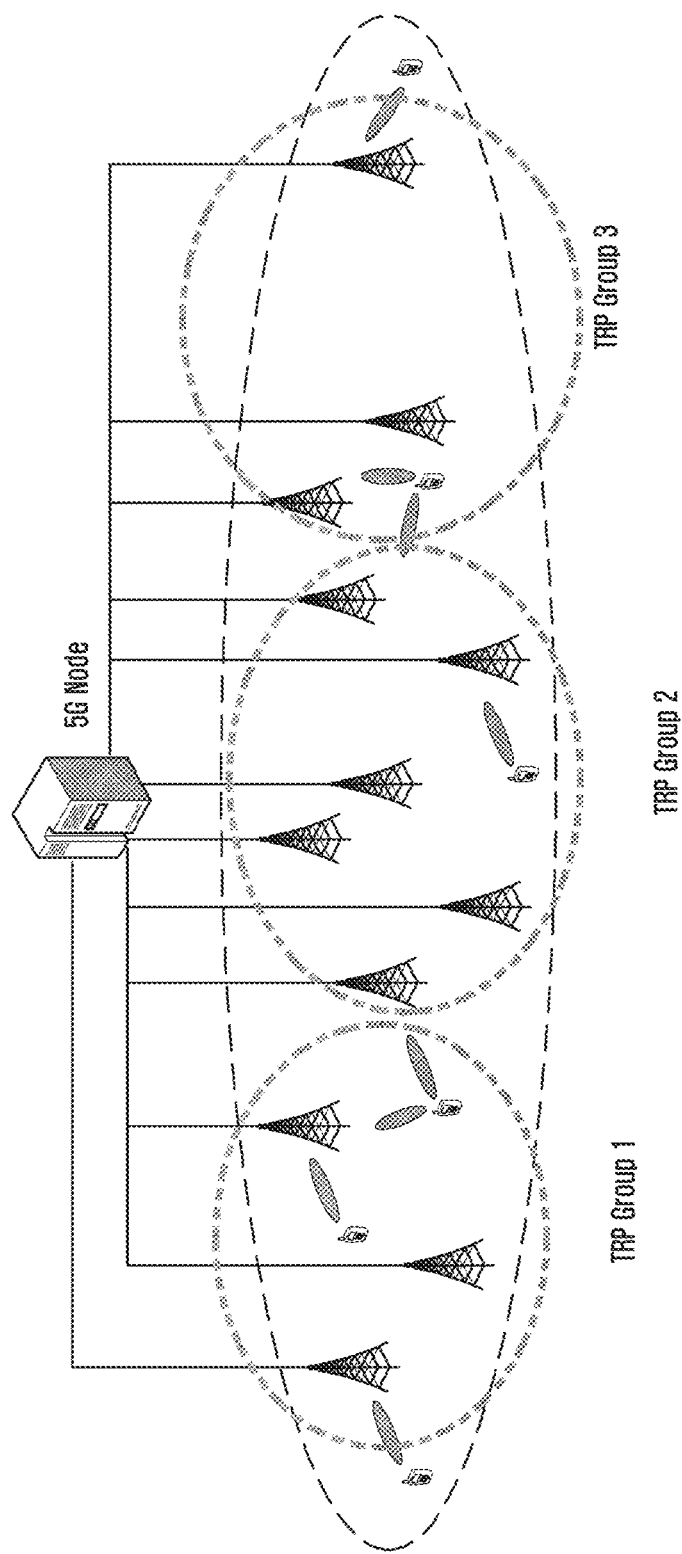
FIG. 24 illustrates an embodiment of avoiding paging according to various embodiments of the present disclosure.
Figure 25:
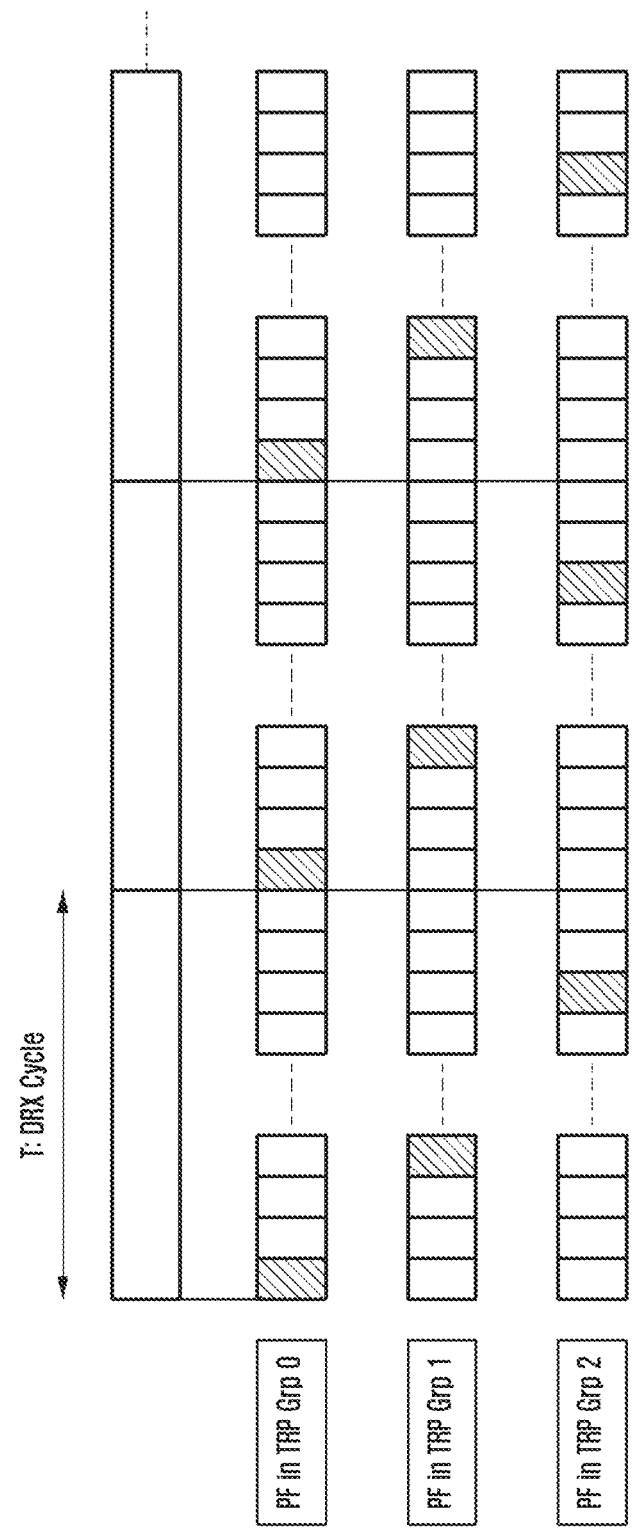
FIG. 25 illustrates another embodiment of avoiding paging according to various embodiments of the present disclosure.
Figure 26:
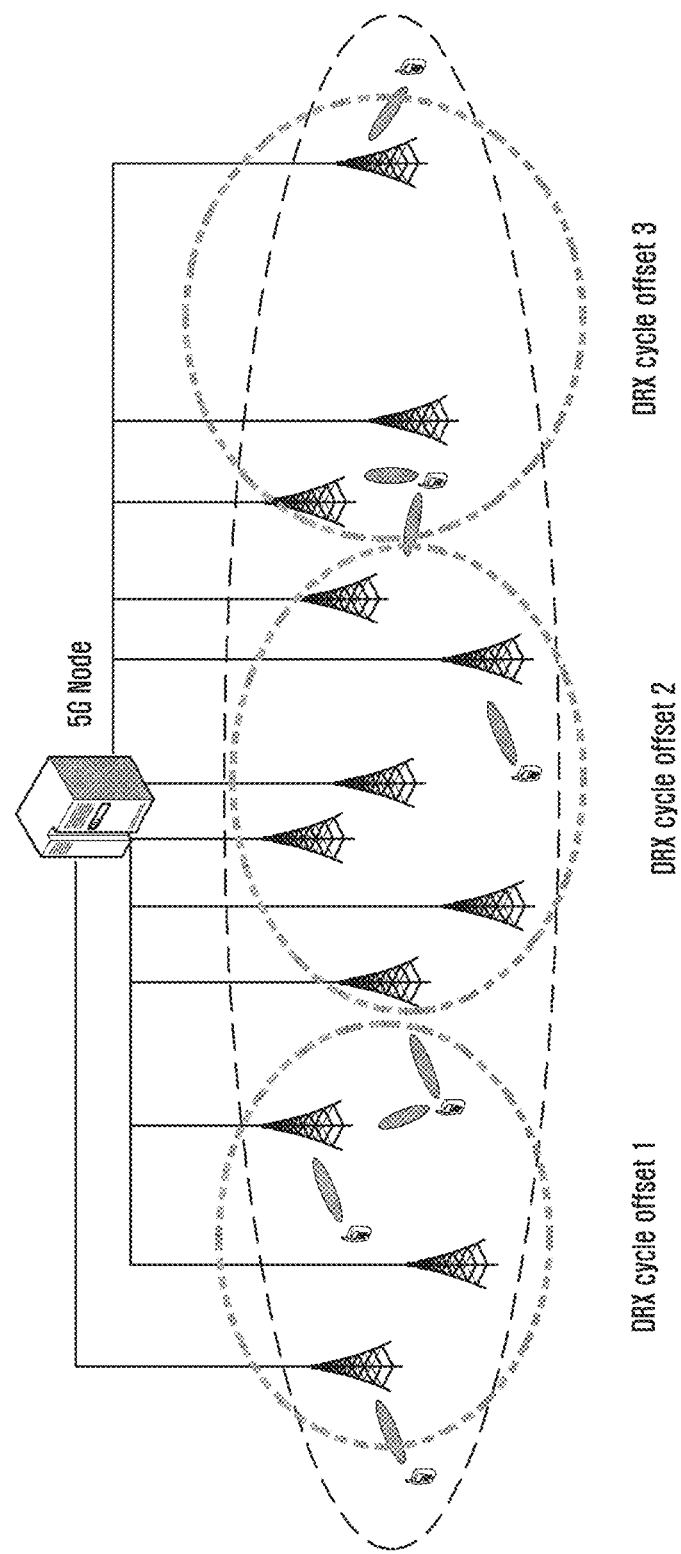
FIG. 26 illustrates yet another embodiment of avoiding paging according to various embodiments of the present disclosure.

FIGS. 24 to 26 illustrate embodiments of avoiding paging according to various embodiments of the present disclosure.

According to an embodiment illustrated in FIG. 24, a cell can be covered by a plurality of TRPs. And TRPs can be grouped into multiple groups based on their physical location in cell coverage. TRP Group ID of each TRP groups is broadcasted by each TRP in the TRP group. When TRP group is changed by mobility of UE, the UE sends TRP update message to an eNB of the cell. An eNB maintains mapping of UE Identity (e.g. S-TMSI) and TRP Group. When an eNB receives paging message, paging is done in TRP group corresponding to the UE to be paged.

In another embodiment, paging frame in each TRP group can be shifted in time manner by using the TRP group ID, as shown in FIG. 25. For example, a radio frame which meets the equation 12 below is determined to be a paging frame, as the TRP group shifting embodiment applies. Equation 12 is given by:

$$SFN \bmod T = (T \operatorname{div} N) * (UE\_ID \bmod N) + (TRP \text{ group } ID * \text{Offset}) \quad \text{Equation (12)}$$

A UE calculates paging frame using TRP group ID and offset. When an eNB receives paging message, paging is first done in TRP group 0 and if paging response is not received, the eNB pages in TRP group 1 and so on. Also, paging response identification can be done by the eNB using establishment cause field in MSG3 or PRACH for paging or some new fields in MSG3.

Alternately, DRX cycle offset can be signaled wherein the DRX cycle offset can be different for different TRP or set of TRPs, as shown in FIG. 26. For example, DRX cycle offset can be determined as the equations 13 or 14 below:

$$SFN \bmod T = (T \operatorname{div} N) * (UE\_ID \bmod N) + (\text{Offset}) \quad \text{Equation (13)}$$

$$(SFN + \text{Offset}) \bmod T = (T \operatorname{div} N) * (UE\_ID \bmod N) \quad \text{Equation (14)}$$

When an eNB receives paging message, paging is first done in TRP(s) with same DRX cycle offset and if paging response is not received, the eNB pages in using TRP(s) with different offset and so on. Also, paging response identification can be done by the eNB using establishment cause field in MSG3 or PRACH for paging or some new fields in MSG3.

Figure 27:
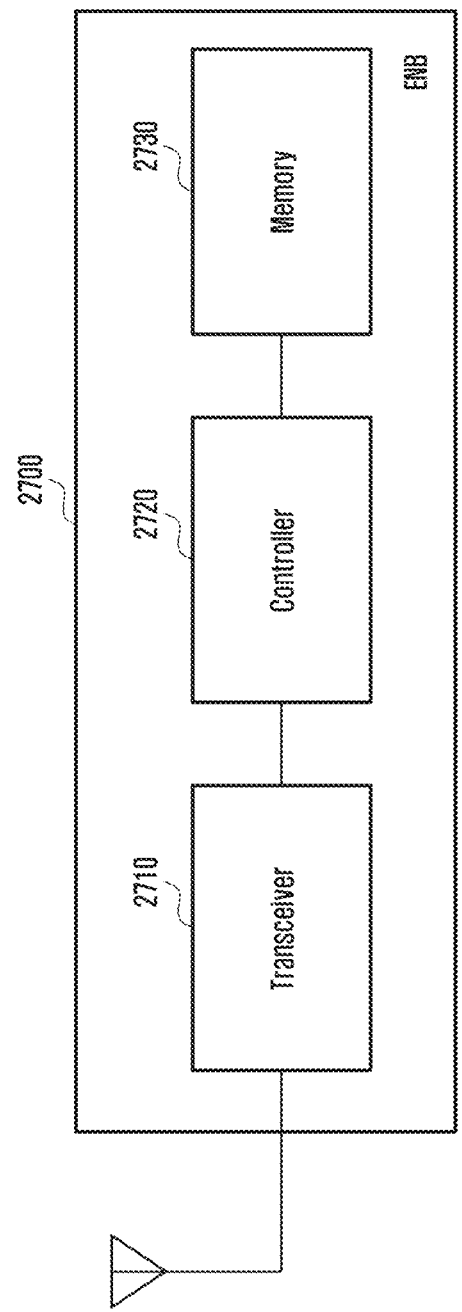
FIG. 27 illustrates an eNB apparatus according to various embodiments of the present disclosure.

FIG. 27 illustrates an eNB apparatus according to various embodiments of the present disclosure.

Referring to FIG. 27, the eNB (2700) includes a transceiver (2710), a controller (2720) and a memory (2730). The eNB (2700) in FIG. 27 may be referred to as a gNB or a base station. Alternatively, the transceiver may be implemented as a transmitter and a receiver, and each component may be implemented through one or more processors. The transceiver may transmit paging message and/or synchronization signal to a UE and may receive beam indication signal from the UE. The memory may store information from the beam indication signal. The controller is configured to identify and/or determine paging frame and paging occasion, and controls the transceiver and the memory to process the paging procedures according to the embodiments of the present disclosure. The controller may be implemented through at least one processor.

Figure 28:
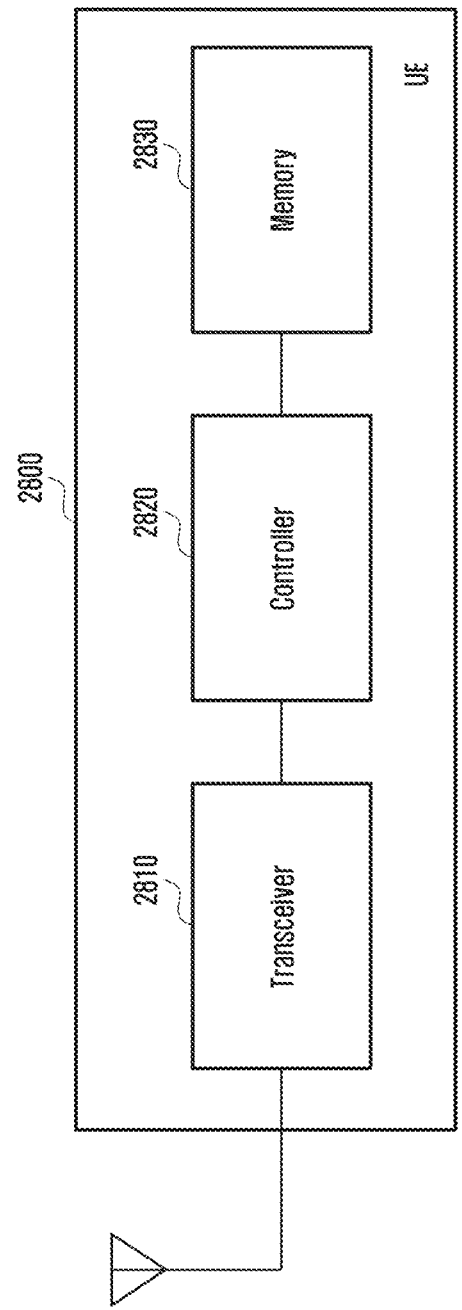
FIG. 28 illustrates a UE apparatus according to various embodiments of the present disclosure.

FIG. 28 illustrates a UE apparatus according to various embodiments of the present disclosure.

Referring to FIG. 28, the UE (2800) includes a transceiver (2810), a controller (2820) and a memory (2830). Alternatively, the transceiver may be implemented as a transmitter and a receiver, and each component may be implemented through one or more processors. The transceiver may receive paging message and/or synchronization signal from an eNB and may transmit beam indication signal to the eNB. The memory may store best/suitable beam information and timing of the paging message and/or synchronization signal with respect to the beam configuration. The controller is configured to identify and/or determine paging frame and paging occasion, and controls the transceiver and the memory to process the paging procedures according to the embodiments of the present disclosure. The controller may be implemented through at least one processor.

The above-described embodiments of the present disclosure and the accompanying drawings have been provided only as specific examples in order to assist in understanding the present disclosure and do not limit the scope of the present disclosure. Accordingly, those skilled in the art to which the present disclosure pertains will understand that other change examples based on the technical idea of the present disclosure may be made without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, paging search space information;
   identifying at least one physical downlink control channel (PDCCH) monitoring occasion for paging based on the paging search space information; and
   receiving, from the base station, a paging message by monitoring a PDCCH monitoring occasion of the identified at least one PDCCH monitoring occasion for paging,
   wherein a synchronization signal block (SSB) corresponding to the PDCCH monitoring occasion is received in a same time unit of the PDCCH monitoring occasion.

2. The method of claim 1, further comprising:
   receiving, from the base station, information associated with a plurality of resource blocks (RBs) for the PDCCH monitoring occasion.

3. The method of claim 2, wherein the information associated with the plurality of RBs is further associated with a number of symbols for the PDCCH monitoring occasion.

4. The method of claim 1, wherein the SSB is frequency division multiplexed with the PDCCH monitoring occasion.

5. The method of claim 1, wherein the time unit includes a slot or a symbol, and
wherein each of the at least one PDCCH monitoring occasion corresponds to a paging slot.

6. A method performed by a base station in a wireless communication system, the method comprising:
transmitting, to a terminal, paging search space information for identifying at least one physical downlink control channel (PDCCH) monitoring occasion for paging based; and
transmitting, to the terminal, a paging message in a PDCCH monitoring occasion of the at least one PDCCH monitoring occasion,
wherein the PDCCH monitoring occasion of the at least one PDCCH monitoring occasion for paging is monitored by the terminal to receive the paging message, and
wherein a synchronization signal block (SSB) corresponding to the PDCCH monitoring occasion is transmitted in a same time unit of the PDCCH monitoring occasion.

7. The method of claim 6, further comprising:
transmitting, to the terminal, information associated with a plurality of resource blocks (RBs) for the PDCCH monitoring occasion.

8. The method of claim 7, wherein the information associated with the plurality of RBs is further associated with a number of symbols for the PDCCH monitoring occasion.

9. The method of claim 6, wherein the SSB is frequency division multiplexed with the PDCCH monitoring occasion.

10. The method of claim 6, wherein the time unit includes a slot or a symbol, and
wherein each of the at least one PDCCH monitoring occasion corresponds to a paging slot.

11. A terminal in a wireless communication system, the terminal comprising:
a transceiver configured to transmit and receive a signal; and
a controller coupled with the transceiver and configured to:
receive, from a base station, paging search space information,
identify at least one physical downlink control channel (PDCCH) monitoring occasion for paging based on the paging search space information, and
receive, from the base station, a paging message by monitoring a PDCCH monitoring occasion of the identified at least one PDCCH monitoring occasion for paging,
wherein a synchronization signal block (SSB) corresponding to the PDCCH monitoring occasion is received in a same time unit of the PDCCH monitoring occasion.

12. The terminal of claim 11, wherein the controller is further configured to:
receive, from the base station, information associated with a plurality of resource blocks (RBs) for the PDCCH monitoring occasion.

13. The terminal of claim 12, wherein the information associated with the plurality of RBs is further associated with a number of symbols for the PDCCH monitoring occasion.

14. The terminal of claim 11, wherein the SSB is frequency division multiplexed with the PDCCH monitoring occasion.

15. The terminal of claim 11, wherein the time unit includes a slot or a symbol, and
wherein each of the at least one PDCCH monitoring occasion corresponds to a paging slot.

16. A base station in a wireless communication system, the base station comprising:
a transceiver configured to transmit and receive a signal; and
a controller coupled with the transceiver and configured to:
transmit, to a terminal, first information configuring a search space associated with a paging for identifying at least one physical downlink control channel (PDCCH) monitoring occasion for paging, and
transmit, to the terminal, a paging message in a PDCCH monitoring occasion of the at least one PDCCH monitoring occasion,
wherein the PDCCH monitoring occasion of the at least one PDCCH monitoring occasion for paging is monitored by the terminal to receive the paging message, and
wherein a synchronization signal block (SSB) corresponding to the PDCCH monitoring occasion is transmitted in a same time unit of the PDCCH monitoring occasion.

17. The base station of claim 16, wherein the controller is further configured to:
transmit, to the terminal, information associated with a plurality of resource blocks (RBs) for the PDCCH monitoring occasion.

18. The base station of claim 17, wherein the information associated with the plurality of RBs is further associated with a number of symbols for the PDCCH monitoring occasion.

19. The base station of claim 16, wherein the SSB is frequency division multiplexed with the PDCCH monitoring occasion.

20. The base station of claim 16, wherein the time unit includes a slot or a symbol, and
wherein each of the at least one PDCCH monitoring occasion corresponds to a paging slot.

* * * * *